US008825385B2

(12) United States Patent
Iguchi et al.

(10) Patent No.: US 8,825,385 B2
(45) Date of Patent: Sep. 2, 2014

(54) INFORMATION TERMINAL DEVICE, INFORMATION TERMINAL MANAGEMENT SYSTEM, AND STORAGE MEDIUM IN WHICH PROGRAM IS STORED

(75) Inventors: Shinya Iguchi, Yokohama (JP); Tatsuaki Osafune, Kawasaki (JP); Takatoshi Kato, Yokohama (JP); Kazutomo Kobayashi, Kawaguchi (JP); Hiroyuki Mano, Chigasaki (JP); Hiroki Uchiyama, Hitachinaka (JP)

(73) Assignee: Clarion Co., Ltd., Saitama (JP)

( * ) Notice: Subject to any disclaimer, the term of this patent is extended or adjusted under 35 U.S.C. 154(b) by 142 days.

(21) Appl. No.: 13/508,239

(22) PCT Filed: Nov. 2, 2010

(86) PCT No.: PCT/JP2010/069496
§ 371 (c)(1),
(2), (4) Date: Jun. 15, 2012

(87) PCT Pub. No.: WO2011/055722
PCT Pub. Date: May 12, 2011

(65) Prior Publication Data
US 2012/0253662 A1    Oct. 4, 2012

(30) Foreign Application Priority Data
Nov. 5, 2009  (JP) .................................. 2009-253971

(51) Int. Cl.
*G01C 21/30* (2006.01)
(52) U.S. Cl.
USPC ....... 701/428; 340/870.02; 345/173; 715/201
(58) Field of Classification Search
USPC ................ 701/400, 428; 340/870.02, 870.07; 345/173, 174, 175; 715/201, 716, 732, 715/773
See application file for complete search history.

(56) References Cited

U.S. PATENT DOCUMENTS

| 7,030,890 | B1* | 4/2006 | Jouet et al. ..................... 345/619 |
| 8,427,437 | B2* | 4/2013 | Chae et al. ..................... 345/173 |
| 2011/0022393 | A1* | 1/2011 | Waller et al. .................. 704/270 |
| 2011/0047014 | A1* | 2/2011 | De Angelo .................... 705/14.4 |
| 2011/0098918 | A1* | 4/2011 | Siliski et al. .................. 701/201 |
| 2011/0109472 | A1* | 5/2011 | Spirakis et al. .......... 340/870.02 |
| 2012/0077475 | A1* | 3/2012 | Holcomb et al. .......... 455/414.1 |

FOREIGN PATENT DOCUMENTS

| JP | 2011-075772 A | 3/2001 |
| JP | 2003-307422 A | 10/2003 |

(Continued)

*Primary Examiner* — Helal A Algahaim
*Assistant Examiner* — Shardul Patel
(74) *Attorney, Agent, or Firm* — Mattingly & Malur, PC

(57) ABSTRACT

An aspect of the invention is an information terminal device includes a widget management unit for managing execution of a widget being a monofunctional program for performing display on the display part of a display device. The widget management unit includes a policy determination unit for determining the operation policy, including operation restriction and priority, concerning a display state at the display device in the widget, and a reliability determining unit for determining the reliability representing the reliability of the widget in the widget. When the state of the movement calculated by a navigation unit becomes a preset state, the widget management unit regulates the display state of the widget according to the operation restriction and the reliability, and performs display, while preferentially displaying guidance state and positional information calculated by the navigation unit.

14 Claims, 18 Drawing Sheets

(56) References Cited

FOREIGN PATENT DOCUMENTS

| | | | |
|---|---|---|---|
| JP | 2004-251738 A | | 9/2004 |
| JP | 2004251738 | * | 9/2004 |
| JP | 2005-16651 A | | 4/2005 |
| JP | 2006-23171 A | | 1/2006 |
| JP | 2007-045168 A | | 2/2007 |
| JP | 2007-114402 A | | 5/2007 |
| JP | 2008-186208 A | | 8/2008 |

* cited by examiner

FIG. 2A

LOCATION INFORMATION DEVICE MANAGEMENT INFORMATION ∕‾151

| DEVICE TYPE NUMBER (210) | SCREEN SIZE (211) | WIDGET RECORDING CAPACITY (kB) (212) | WIDGET AUTHENTICATING FUNCTION (213) | WIDGET CONCURRENT EXECUTABILITY THRESHOLD (214) |
|---|---|---|---|---|
| N-1 | 800x480 | 2048 | YES | 10 |
| N-2 | 600x480 | 1000 | NO | 7 |
| N-3 | 320x200 | 4000 | NO | 3 |
| ... | | | | |

FIG. 2B

WIDGET MANAGEMENT INFORMATION ∕‾152

| IDENTIFICATION (220) | WIDGET NAME (221) | SIZE (kB) (222) | OPERATING LOAD VALUE (223) | CONCURRENT OPERATION PROHIBITION (224) | OPERATION RESTRICTION (225) |
|---|---|---|---|---|---|
| W1 | WEATHER | 124 | 5 | W4 | OPERATION RESTRICTION DEFINITION |
| W2 | NEWS | 132 | 4 | W5, W12 | |
| W3 | STOCK | 212 | 2 | W7 | |
| ... | | | | | |

FIG. 2C

WIDGET BLACKLIST ∕‾155

| WIDGET NAME (330) | DETECTION COUNT (331) | OPERATION RESTRICTION (332) |
|---|---|---|
| BADWEATHER | 12 | OPERATION RESTRICTION DEFINITION —204 |
| BADNEWS | 20 | |
| BADSTOCK | 33 | |
| ... | | |

FIG. 3A

USER BASIC INFORMATION ⟋ 153    410

| USER ID | DEVICE TYPE IDENTIFICATION NUMBER | AVAILABLE WIDGET RECORDING CAPACITY (kB) | INSTALLED WIDGET LIST |
|---|---|---|---|
| U1 | N-1 | 254 | W1, W2, W4 |
| U2 | N-2 | 345 | W2, W5 |
| U3 | N-1 | 654 | W3, BADWEATHER |
| ... | | | |

FIG. 3B

USER DEVICE LOAD HISTORY — 154

| USER ID | RECORDED DATE/TIME | LOCATION (LATITUDE, LONGITUDE) | CPU UTILIZATION RATIO | AVAILABLE MEMORY CAPACITY (kB) | LOAD AMOUNT | RUNNING WIDGET LIST |
|---|---|---|---|---|---|---|
| U1 | 2009/7/21 10:15 | (121,87) | 80% | 1330 | 15 | W1,W2,W12,W15 |
|  | 2009/6/12 15:31 | (23,83) | 75% | 2332 | 14 | W3,W5 |
|  | 2009/5/11 16:21 | (65,60) | 70% | 4343 | 9 | W5,W7,W12 |
|  | ... | | | | | |
| U2 | ... | | | | | |
| U3 | ... | | | | | |
| ... | | | | | | |

FIG. 4

WIDGET MANAGEMENT INFORMATION — 142

| WIDGET ID | WIDGET SET VALUES | | | | CURRENT STATE | |
|---|---|---|---|---|---|---|
|  | LOAD INDEX | EXECUTION PRIORITY | | | DISPLAY | OPERATION RESTRICTION |
|  |  | PARKED | DRIVING | NAVIGATING |  |  |
| W1 | 4 | 1 | 2 | 2 | DISPLAYED | 0 |
| W3 | 3 | 2 | 3 | 1 | NOT DISPLAYED | 1 |
| W5 | 2 | 3 | 1 | 2 | NOT RUNNING | 2 |
| ... | | | | | | |

FIG. 5

WIDGET-LIBRARY ASSOCIATION TABLE — 124

| | LIBRARY NAME | GPS | MP3 | POIAdmin | ... |
|---|---|---|---|---|---|
| | I/F Ver. | 1.1 | 1.3 | 1.5 | |
| WIDGET ID | W1 | 1.1 | 1.1 | | |
| | W3 | 1.1 | | 1.2 | |
| | W5 | 0.9 | | 2.0 | |
| ... | | | | | |

LIBRARY OPERATION HISTORY TABLE — 126

| HISTORY No. | LIBRARY OPERATION PATTERN | | HEAVY LOAD LIBRARY ID | AVERAGE CPU LOAD (%) |
|---|---|---|---|---|
| | PREVIOUS LIBRARY | | | |
| | ID | AVERAGE EXECUTION TIME (s) | | |
| 1 | 5 | 1212 | 1 | 80 |
| 2 | 11 | 121 | 4 | 75 |
| 3 | 22 | 111 | 8 | 65 |
| ... | | | | |

602 / 603 / 604

INFORMATION TERMINAL DEVICE, INFORMATION TERMINAL MANAGEMENT SYSTEM, AND STORAGE MEDIUM IN WHICH PROGRAM IS STORED

CROSS-REFERENCE TO RELATED APPLICATION

The present application claims priority from Japanese patent application JP2009-253971 filed on Nov. 5, 2009, the content of which is hereby incorporated by reference into this application.

TECHNICAL FIELD

This invention relates to a device that has a communication function and a function of handling location information and that is incorporated in a cell phone, a car navigation system, a TV, or the like, and to a system using the device.

BACKGROUND ART

In recent years, the sophistication of portable device functions, coupled with the increase of portable devices equipped with a location information processing function and compatible with services provided over a network, is making it difficult to achieve distinction from competitors by equipping or not equipping the portable device with a function.

Therefore, in order to develop a portable device that appeals to users, it has become important to put energy to more surficial aspects of a product such as the casing, screen design, and graphical user interface (GUI). Updating and accommodating the product to new services over a network after the product is shipped is also indispensable in order to motivate users to own and use the product for a long time. In addition, terminal price competition is accelerating, pushing the prices of portable devices further down.

Under these circumstances, in the field of location information device that have a car navigation function or the like, the following efforts for providing a device that appeals to users while keeping the cost low are attracting attention:

(1) Facilitating the introduction of new services: Enabling a navigation system to communicate, adding a service in cooperation with a navigation service center which provides map information and the like, and equipping the terminal with a widget which provides information on the display screen.

(2) Facilitating the acquirement of a screen and contents, and reducing the development span: Promptly incorporating requests of the designer. Utilizing contents that are provided by a user or a third party. Passing around contents among a plurality of users.

The above-mentioned contents used on a location information device can be applications such as a widget displayed on a display of the location information device.

A "widget" refers to a single-function application that is written in XML and a script language and that is displayed all the time in a part of the screen of the display.

In many conventional location information devices, however, all the equipped functions have already been configured in advance in order to accomplish smooth operation while ensuring the user's safety with limited hardware resources (CPU performance, memory capacity, and the like), and the operation of each function, too, is strictly managed at the manufacture stage to give the terminal a structure that reduces operation failures or the like as much as possible. Consequently, adding functions after a location information device is shipped, which is necessary to accomplish the above items (1) and (2), is difficult to carry out while guaranteeing safety and smooth operation. With a location information device that has few hardware resources to spare, in particular, it is a possibility that an added function may interfere with an existing function in unexpected situations, making the terminal operation unstable.

Screen display control method that address to these problems have been proposed. For example, Patent Literature 1 proposes a method in which screen data to be output to a display is divided into drawing elements and methods of animating the drawing elements in order to manage the two separately and, when one drawing element is displayed, an animation is output in accordance with an animation method that is associated with the element if certain conditions are satisfied.

CITATION LIST

Patent Literature

Patent Literature 1: JP 2001-75772 A

SUMMARY OF INVENTION

Technical Problem

The prior art described above, where the animation display method is switched along only predetermined state transition data, has a problem in that animation display cannot be controlled dynamically when the display management state is the same but situations other than the management of the state transition data, such as the system's load situations, differ.

Furthermore, in the prior art described above, means for identifying providers of graphics elements and animation elements is not provided, and therefore elements added dynamically via a network or the like (graphics elements and animation elements) are displayed regardless of the reliability of the elements. Accordingly, there is a fear in that a function added by the user or others may interfere with an existing function or may cause an overload on hardware resources, thereby making the operation of the location information device unstable. In other words, the prior art described above has a problem in that a function added by the user or others hinders original functions of the location information device (for example, a function of displaying a map and the traveling direction) if the added function is a malicious function. There is another fear with a location information device limited in hardware resources in that executing an added function that requires large hardware resources may stop or destabilize original functions of the location information device.

This invention has been made in view of the problems described above, and it is an object of this invention to prevent a function such as a widget that is added by the user or others from hindering original functions of a location information device, to thereby prevent the usability of the location information device from being reduced. Another object of this invention is to improve the reliability of a location information device by determining the reliability of a function such as a widget that is added by the user or others and removing an added unauthorized function.

An aspect of the invention is an information terminal device, which provides information for navigation to a set destination, the information terminal device comprising: a CPU for performing computing processing; a memory for storing information; a location information detecting module for detecting a current location and thereby detecting a navigation state; a navigation module for calculating location information from the detected current location and from map information, and calculating navigation information with respect to a set destination; a display unit for displaying the location information and the navigation information; a communication module for communicating over a network; and a widget management module for managing execution of a widget, which is a single-function program and displays on the display unit, wherein the widget management module comprises: a policy determining module for setting to the widget an operation policy, which comprises an operation restriction concerning a display state on the display unit and a priority; and a reliability determining module for determining reliability of the widget, and wherein, when the traveling state reaches a preset state, the widget management module restricts operation of the widget in accordance with the operation restriction and the reliability, and displays preferentially the location information and information about a navigation state.

Advantageous Effects of Invention

According to a representative embodiment of this invention, the operation of a widget can be limited in a manner that suits the performance and operation state of an information terminal device equipped with the widget, and the usability of the widget and the information terminal device equipped with the widget is thus prevented from being reduced.

BRIEF DESCRIPTION OF DRAWINGS

FIG. 2A is an explanatory diagram illustrating an example of the location information device management information.

FIG. 2B is an explanatory diagram illustrating an example of the widget management information.

FIG. 2C is an explanatory diagram illustrating an example of the widget blacklist.

FIG. 3A is an explanatory diagram illustrating an example of the user basic information.

FIG. 3B is an explanatory diagram illustrating an example of the user terminal load history.

FIG. 4 is a diagram illustrating the widget management information.

FIG. 5 is an explanatory diagram illustrating the widget-library association table.

FIG. 6 is an explanatory diagram illustrating the library operation history table.

DESCRIPTION OF EMBODIMENT

An embodiment of this invention is described below with reference to the accompanying drawings.

Figure 1A:
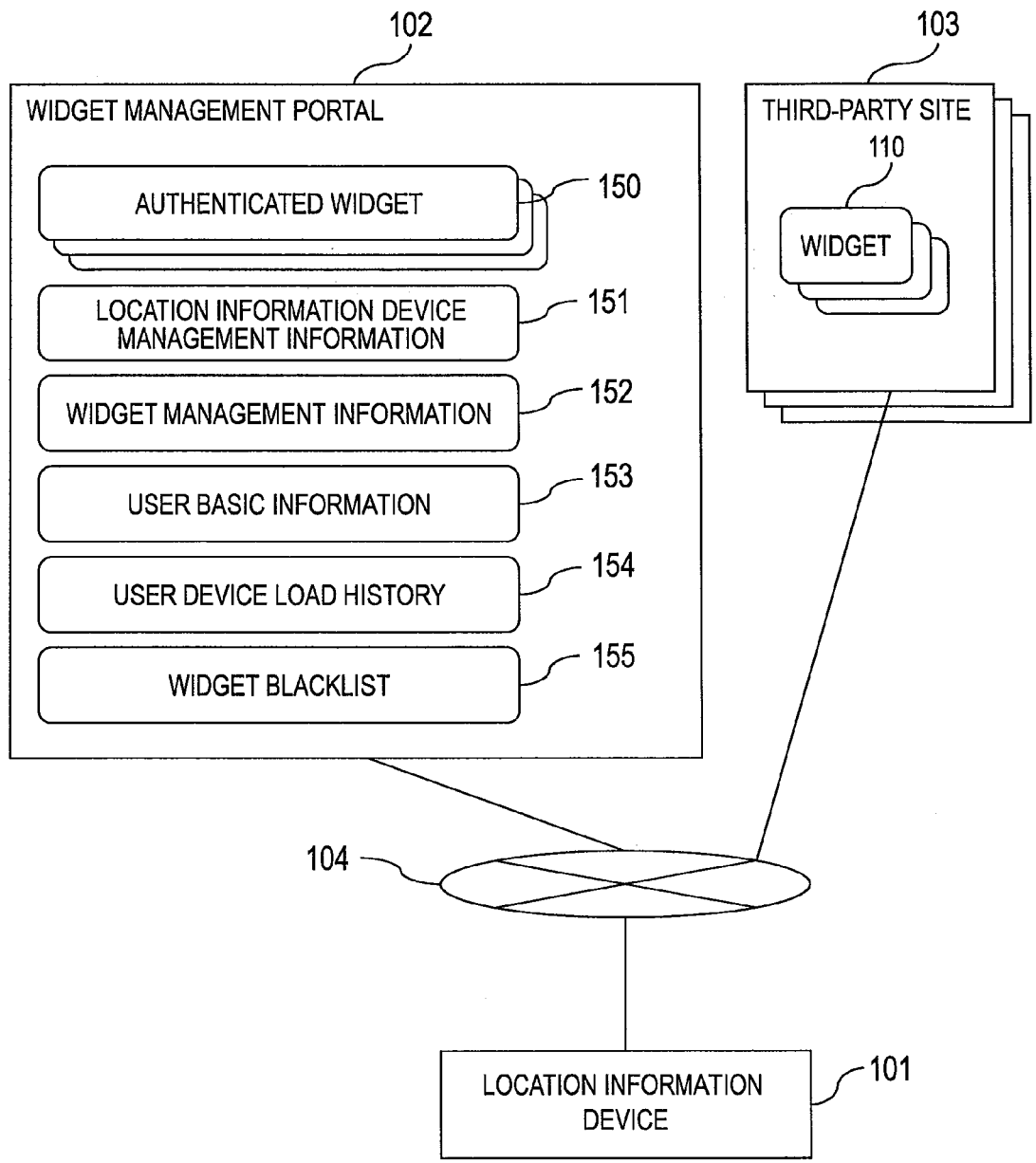
FIG. 1A shows an embodiment of this invention, and is a block diagram showing an example of a location information device system.
Figure 1B:
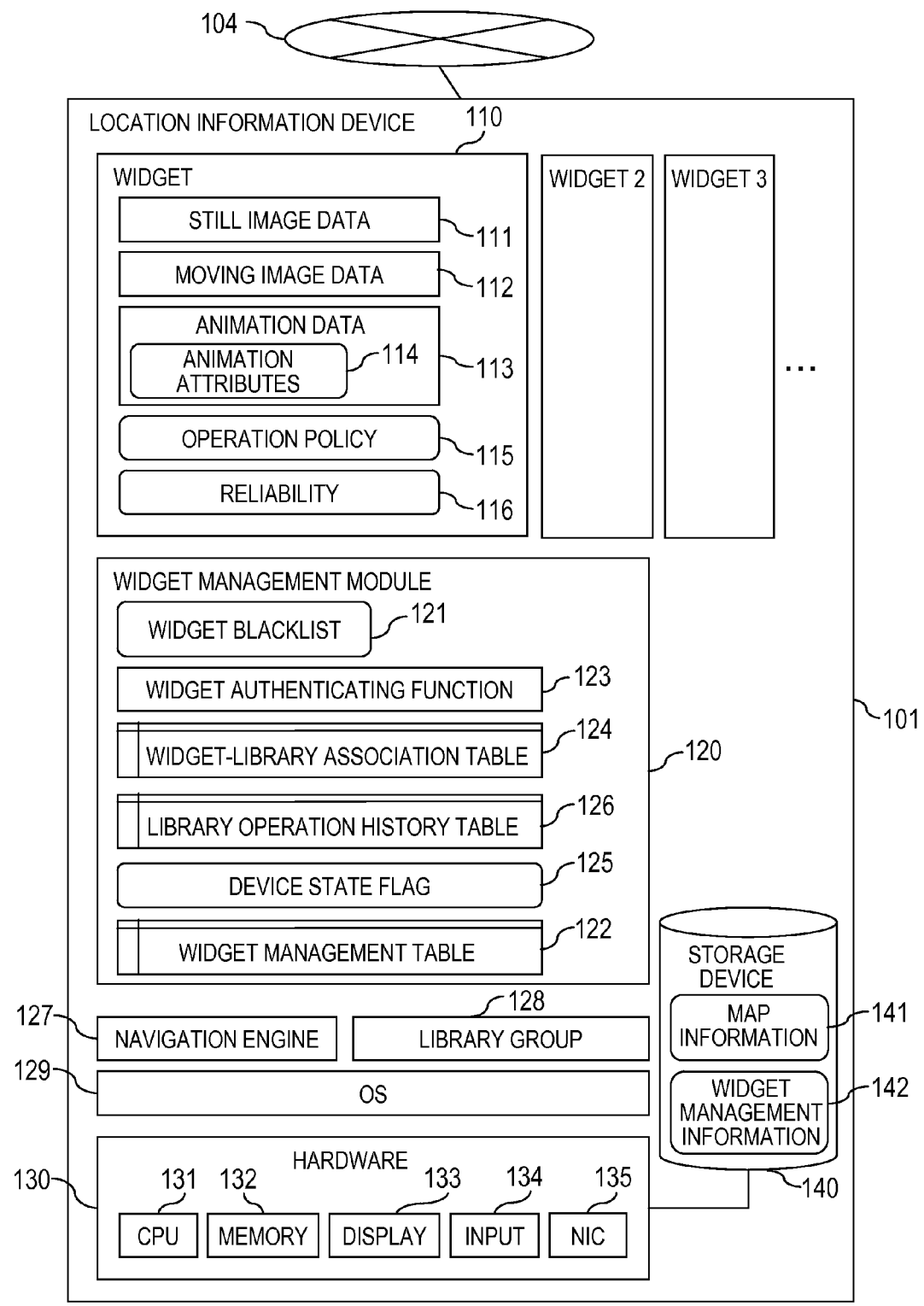
FIG. 1B shows an embodiment of this invention, and is a block diagram showing an example of a location information device system.

FIGS. 1A and 1B are block diagrams illustrating an example of a location information device system to which this invention is applied. A location information device illustrated in the drawings has a configuration that allows a user or others to add widgets.

A location information device 101 is coupled via a network 104 to a widget management portal 102 and to third-party sites 103. The location information device 101 includes widgets 110, a widget management module 120, a navigation engine 127, a library group 128, an OS 129, hardware 130, and a recording device 140.

A widget is, as described in the above prior art, a single-function application written in at least one of XML and a script language. Script languages discussed here are JavaScript, ActionScript, Ruby, Python, and the like.

The location information device 101 is a device that identifies the current location and executes processing suitable for the identified current location. The location information device 101 is, for example, a navigation system set in a vehicle or a PND, and includes the widgets 110, the widget management module 120, the navigation engine 127, the library group 128, the OS 129, the hardware 130, and the recording device 140. The following description deals with a case where the location information device 101 is a vehicle navigation system.

The software including the widgets 110, the widget management module 120, the navigation engine 127, the library group 128, and the OS 129 is stored in the recording device (storage device) 140, which serves as a recording medium, and is loaded onto a memory 132 to be executed by a CPU 131.

Each widget 110 is a single-function program built from XML and a script and having a display function. The widget 110 constantly displays still image data 111, animation data 113, moving image data 112, and the like in a part of a screen (display area) of a display 133, and is constituted of an operation policy 115, reliability 116, and moving image data 112. This invention is also applicable to cases where a program having a display function is used instead of a widget.

The still image data 111 is still image data such as a bitmap image or a JPEG image that is displayed on the display 133 by the widget 110.

The animation data 113 is moving image data that is displayed on the display 133 by the widget 110. Each piece of animation data 113 is allocated animation attributes 114 which the widget management module 120 refers to in order to control animation in a manner determined by the state of the location information device 101.

The operation policy 115 describes operation standards of the widget 110 and is data that defines in advance an operation suitable for the control state of the location information device 101. The widget management module 120 determines the operation policy 115 for each widget 110.

As the operation policy 115, five different states (normal (stationary)/driving/navigating/heavy load navigating/entrance to a specific area), for example, are considered with respect to the following parameters:

<Widget Execution Priority>

The widget execution priority of one widget 110 is set by the widget management module 120 with execution priority information of widget management information 142 as a basic value. After the widget 110 is downloaded to the location information device 101, the set widget execution priority is changed based on the reliability 116 of another widget 110 that has already been loaded onto the location information device 101 and the reliability 116 of the downloaded widget 110. For example, in the case where the reliability of the previously loaded widget 110 is higher than that of the downloaded widget 110, the widget management module 120 lowers the execution priority of the downloaded widget 110.

<Animation Control Policy>

An animation control policy has a basic value that is set based on a load index of the widget management information 142. After one widget 110 is downloaded to the location information device 101, the animation control policy is changed based on a relation between the reliability 116 of another widget 110 that has already been loaded onto the location information device 101 and the reliability 116 of the downloaded widget 110.

<External Information Access Control>

External information access is controlled in accordance with the reliability 116 of the widget 110. When the reliability 116 becomes equal to or lower than one of reference values that represent several stages determined in advance, control is exercised to prohibit access during navigation, to prohibit access during driving, to prohibit access completely, or the like.

<Navigation Function Access Control>

Navigation function access is controlled in accordance with the reliability of the widget. When the reliability 116 becomes equal to or lower than one of reference values that represent several stages determined in advance, control is exercised to prohibit access during navigation, to prohibit access during driving, to prohibit access completely, or the like.

The execution priority described above which is denoted by 512 may be set, for example, in accordance with reliability. Specifically, the execution priority 512 may be set high when reliability is high whereas a low execution priority 512 is set when reliability is low.

The operation policy 115 may be set as a fixed value embedded in the widget 110 when the widget 110 is designed, or may be set by the widget management portal 102 based on a widget management information 152 when the widget 110 is downloaded to the location information device 101, or may be set by the widget management module 120 after the widget 110 is downloaded to the location information device 101.

The widget management module 120 is a function of managing the widgets 110. The widget management module 120 executes the activation/shutdown and operation control of the widgets 110, authentication using the reliability 116 of each widget 110, and the like. The widget management module 120 has a widget management table 122, a widget authenticating function 123, a widget-library association table 124, a widget blacklist 121, a library operation history table 126, and a device state flag 125. In the case where restrictions on the performance of the location information device 101 are strict, the widget management module 120 may not have the widget blacklist 121 and the widget authentication 123 and all of the processing thereof may be executed by the widget management portal 102 instead.

The widget authenticating function 123 executes the downloading of the widgets 110 and the control of access to the inside of the location information device 101 from the widgets 110. Examples of how access to the inside of the location information device 101 is controlled include a method in which an access key for accessing internal information is provided to the widget 110 whose reliability 116 is equal to or higher than a certain level, and a method in which whether to grant access is determined each time one of the widgets 110 calls up an application program interface (API) from the OS 129.

The widget-library association table 124 is a list of the widgets 110 that have been downloaded by the location information device 101 from the widget management portal 102 or other places. The widget management information 142 is information about the widgets 110 that is held by the location information device 101.

The widget blacklist 121 is a list for registering the widgets 110 that could be detrimental to the location information device 101 or the user (a malicious widget). The widget blacklist 121 records, in the order of urgency, as many widgets on a widget blacklist possessed by the widget management portal 102 as the storage capacity of the location information device 101 allows. The library operation history table 126 records a list of a given number of native applications put into operation which is sorted in the order the applications have been run, and a list holding the given number of entries for the average load of the CPU 131. A native application is an application installed in the location information device 101 at the time the location information device 101 is manufactured.

The device state flag 125 is data for managing states that the location information device 101 is in. The location information device 101 can be in three different states: a parked state, a driving state, and a navigating state. In the case where the location information device 101 is used for traveling on foot, the parked state is a stationary state in which the location information device 101 is not moved from one place to another. For the device state flag 125, the current location detected by the navigation engine 127 is compared against the previous location in order to determine whether the location information device 101 is in a stationary state or a driving state. When the location information device 101 is in a driving state (a state in which the current location is moving), a destination has been set, and the navigation engine is outputting navigation information to the display 133, the device state flag 125 indicates a navigating state.

The navigation engine 127 executes a calculation of the current location of the location information device 101, the generation of map data for display from map information 141, navigation to a destination set by the user, and the like. For example, the navigation engine 127 calculates the current location by receiving a signal such as a GPS signal, calculates location information from the map information 141 and the current location, and outputs the location information to the display 133. The location information includes the map information 141 of the surroundings of the current location and a given graphic form (marker) that indicates the current location. The navigation engine 127 includes an antenna, a receiver, or the like that receives a signal such as a GPS signal.

The library group 128 includes a destination search library, an audio playing library, and other various libraries. A library that needs to be displayed on the display 133 cooperates with the relevant widget 110.

The OS 129 is basic software such as Linux or Windows.

The hardware 130 is hardware necessary to run software of the location information device, and includes the CPU 131, which performs computing processing, the memory 132, which stores data and programs, the display 133, which displays location information and the like, an input device 134, which receives an input from the user of the location information device, and a communication interface 135, which communicates over the network 104 with the widget management portal (a management server) 102 and with a server such as the third-party site (a server set up by a third party) 103. The hardware 130 further includes not-shown functions such as a drawing function, an audio playing function, and a location detecting function.

The recording device 140 keeps data necessary for the operation of the location information device and is built from, for example, a non-volatile storage medium such as a magnetic disk drive (HDD), non-volatile storage (SSD), or an SD memory card.

A program executed by the CPU 131 is provided to the location information device 101 via a non-volatile storage medium (a CD-ROM, a flash memory, or the like) or a network, stored in the storage 140, and loaded onto the memory 132 when the program is executed. It is therefore recommended for the location information device 101 to have an interface for reading a storage medium.

In this embodiment, the recording device 140 holds the map information 141 and the widget management information 142. The map information 141 is map information used by the location information device 101.

The widget management table 122 is a list of widgets that have been downloaded from the management portal 102 or other places.

The animation attributes 114 indicate the attributes of each moving image, and one of values "necessary animation" and "dramatizing animation" is allocated.

A necessary animation is an animation necessary for a user to operate the location information device 101, and is an animation expression indispensable for the function of the widget 110. A necessary animation is, for example, for giving the user an instruction on how to operate the location information device 101.

A dramatizing animation is an embellishing animation and does not include an instruction given to the user about how to operate the location information device 101. When the load on the location information device 101 is heavy, the execution of a dramatizing animation may be restricted.

Other than the three different states of the location information device 101 described above, the parked state, the driving state, and the navigating state, states necessary for control may be allocated. For example, an attribute value for switching display depending on whether the vehicle is driving or not may be allocated.

The reliability 116 is data that indicates the reliability of the widget 110. The reliability 116 signifies to what degree the user can trust the widget 110, in other words, whether the widget 110 does not adversely affect the operation of the location information device 101, and the following attributes, for example, can be used:

The reliability of the distributor which is determined from the URL of the distributor site of the widget 110, in short, the reliability of the widget.

A certificate attached to the widget 110 by the publisher of the widget 110.

The frequency of use by the user which indicates how many times the user has activated the widget 110 in question.

Using the attributes described above, the reliability of each widget 110 can be set in numerical terms. For example, when a distributor URL is authentic, 1 is added to the reliability whereas −1 is added to the reliability 116 when the widget 110 has an inauthentic distributor URL. When a certificate attached to the widget 110 is authentic, 1 is added to the reliability 116 whereas −1 is added to the reliability 116 when the widget 110 has an inauthentic certificate. Further, a given numerical value is added to the reliability 116 each time the frequency of use by the user changes. This way, the reliability 116 of each widget 110 can be determined from a numerical value. The reliability 116 may be determined by the widget management module 120 or by another module that is executed on the OS 129. The reliability 116 may also be a value that indicates the validity of the widget 110. In this case, an authenticated widget 150 which has been authenticated by the widget management portal 102 is set high in the reliability 116 as a highly reliable widget 110, whereas the unauthenticated widget 110 which has been downloaded from one of the third-party sites 103 has a strong possibility of being a malicious or unauthorized widget 110 and therefore is set low in the reliability 116. The reliability 116 of each widget 110 can be set by the widget management module 120 or may be set by another module that is executed on the OS 129.

The widget management portal 102 is a portal site which distributes the widgets 110. For example, the widget management portal 102 is built from a Web server that stores widget data to be distributed, and includes the authenticated widgets 150, location information device management information 151, widget management information 152, user basic information 153, a user terminal load history 154, and a widget blacklist 155. The widget management portal 102 is a computer that includes a CPU, a memory, storage, and a network interface which are not shown in the drawings.

The widget management portal 102 may support a secure communication such as SSL in order to enhance the safety of communication with the location information device 101.

The authenticated widgets 150 are the widgets 110 that have been guaranteed by an operator of the widget management portal 102 to operate on the location information device 101. The operator of the widget management portal 102 checks, for example, the internal structure of one widget 110, the operating load that the widget 110 incurs on the location information device 101, and how much conflict occurs when the widget 110 and another widget 110 are run concurrently.

The location information device management information 151 is, as will be described later, information for managing the location information device 101 that is coupled to this widget management portal 102, and is referred to when the widgets 110 are distributed to the location information device 101.

The widget management information 152 is, as will be described later, for managing information of each widget 110 that is managed by this widget management portal 102. The user basic information 153 is management information of a user of the location information device 101 that is coupled to this widget management portal 102.

The user terminal load history 154 is load history information of the location information device 101 that is coupled to this widget management portal 102. The load state differs from one user's location information device 101 to another user's, and hence the user terminal load history 154 is referred to when the widgets 110 are distributed.

The widget blacklist 155 is a list for registering the widget 110 that is unauthorized or the like. The widget blacklist 155 is referred to in order to check whether or not the widget 110 that has been downloaded by the user onto the location information device 101 is an unauthorized application.

Each third-party site 103 is a site provided by a third party who provides the widget 110 that can be executed on the location information device 101, and distributes the widget 110 to the location information device 101.

The network 104 is a network to which devices are coupled and is a LAN, the Internet, a wireless network, or the like. The moving image data 112 is moving image data that is displayed by the widget 110, and can be various moving image files such as Windows Media Video (WMV), QuickTime movie (MOV), and Flash Video (FLV).

Figure 2D:
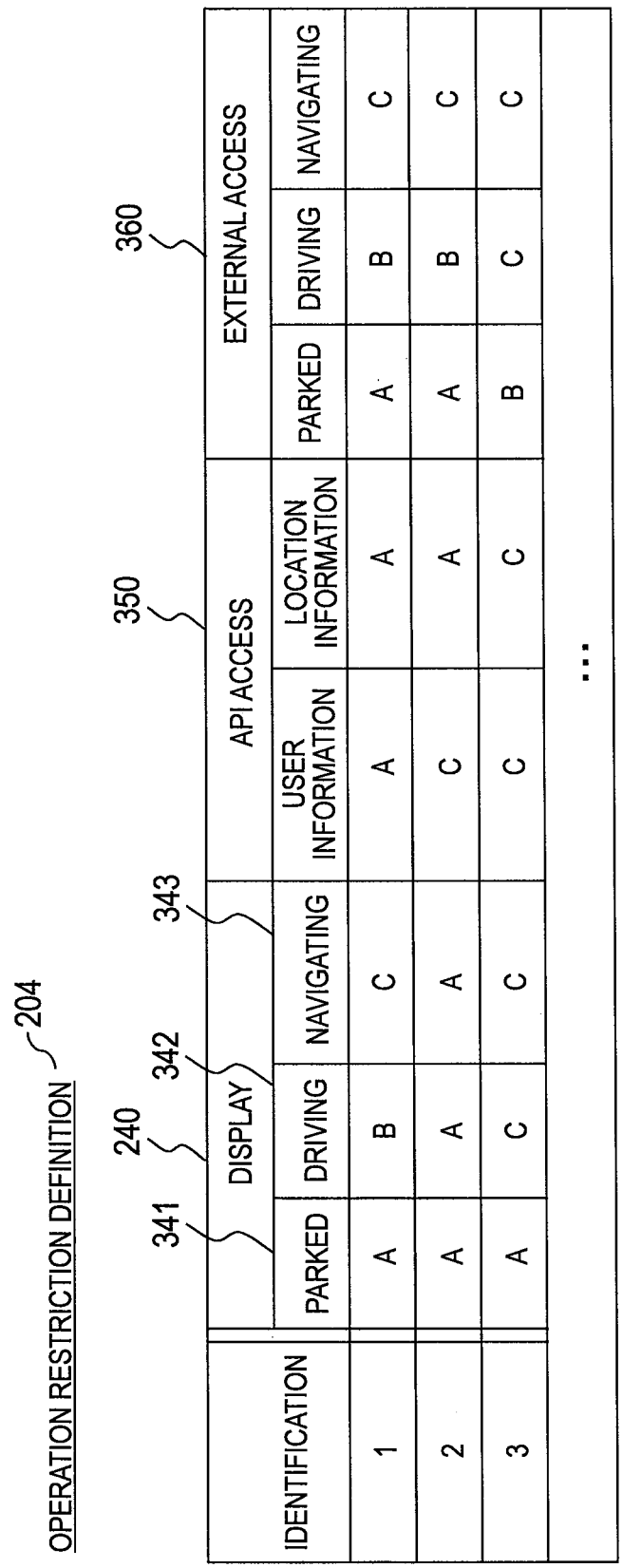
FIG. 2D is an explanatory diagram illustrating an example of the operation restriction definition.

FIGS. 2A to 2D are diagrams illustrating information that is managed by the widget management portal 102. FIG. 2A is an explanatory diagram illustrating an example of the location information device management information 151 managed by the widget management portal 102.

The location information device management information 151 of FIG. 2A includes a device type number 210 of the location information device 101, a screen size 211 of the location information device 101, a widget recording capacity (kB) 212 of the location information device 101, a widget authenticating function 213 of the location information device 101, and a widget concurrent executability threshold 214 of the location information device 101.

The device type number 210 is a number for identifying the model number of the location information device 101, and varies from one device type to another. The screen size 211 is the resolution of the screen (the display 133) of the location information device 101 identified by the device type number 210.

The widget recording capacity (kB) 212 is the maximum capacity of a widget recording area of the location information device 101 identified by the device type number 210.

Stored as the widget authenticating function 213 is a value that indicates the presence or absence of a function of authenticating the widgets 110 in the location information device 101 identified by the device type number 210. A value "Yes" indicates that the location information device 101 is equipped with the authenticating function, and a value "No" indicates that the location information device 101 is not equipped with the authenticating function.

The widget concurrent executability threshold 214 indicates an index of a minimum load necessary for the widgets 110 to operate on the location information device 101 identified by the device type number 210. For example, the widget concurrent executability threshold 214 is an upper threshold for the sum of load index values for a case where a plurality of widgets are executed on the location information device 101. In the case where the widget 110 whose load exceeds the threshold 214 on its own is downloaded, the location information device 101 may display an alert to the user, or other actions may be taken.

The load index is an index calculated with the use of a certain standard from the utilization ratio of the CPU 131 and the occupation ratio of the memory 132 that are observed on the location information device 101 when the widgets 110 are in operation. The load index serves as a measure for determining operating conditions of the widgets 110.

The load index can be calculated by, for example, (CPU utilization ratio (%)+memory occupation ratio (%))/10.

FIG. 2B is an explanatory diagram illustrating an example of the widget management information 152 managed by the widget management portal 102.

The widget management information 152 of FIG. 2B includes an identification 220, a widget name 221, a size (kB) 222, an operating load value 223, a concurrent operation prohibition 224, and an operation restriction 225.

The widget management information 152 is a table for managing the features of each widget 110. The identification 220 is a unique number that varies from one widget 110 to another. The size (kB) 222 is the size of the widget 110 in question. The operating load value 223 is a load index indicating the magnitude of an operating load that is incurred by executing the widget 110 in question on the location information device 101. The concurrent operation prohibition 224 is a list of the widgets 110 that cause a trouble in the operation of the location information device 101 when run concurrently with the widget 110 in question on the location information device 101. The operation restriction 225 indicates a definition of an operation restriction that is applied when the widget 110 in question is executed on the location information device 101. Identification information (an ID) of an operation restriction definition 204 illustrated in FIG. 2D is stored as the operation restriction 225.

FIG. 2C is an explanatory diagram illustrating an example of the widget blacklist 155 managed by the widget management portal 102.

The widget blacklist 155 of FIG. 2C includes a widget name 330, a detection count 331, and an operation restriction 332.

The widget blacklist 155 is a list of the widgets 110 that may harm the location information device 101 and the user.

The detection count 331 is the number of times the widgets 110 in question are detected on lists of the widgets 110 within the location information devices 101, and are values received from the location information devices 101. The detection count 331 serves as a measure of how frequently the widget 110 in question is used on the location information devices 101, and is utilized by, for example, notifying the administrator when the detection count 331 exceeds a certain threshold. The operation restriction 232 indicates an operation restriction applied to the widget 110 that is on the widget blacklist 155. Identification information (an ID) of an operation restriction definition illustrated in FIG. 2D is stored as the operation restriction 232.

FIG. 2D is an explanatory diagram illustrating an example of the operation restriction definition 204 managed by the widget management portal 102.

The operation restriction definition 204 of FIG. 2D includes display 240, parked 341, driving 342, navigating 343, API access 350, and external access 360.

The operation restriction definition 204 is a table in which the specifics of operation restrictions of the widgets 110 are defined in advance. Display 240 indicates for each state of the location information device 101 a display restriction applied to the widgets 110. Display restrictions in this example are defined as follows:

A . . . no restrictions
B . . . animation is prohibited
C . . . display is prohibited Parked 341 indicates a situation where the vehicle equipped with which the location information device 101 is parked, or a situation where the location information device 101 is not traveling.

Navigating 243 indicates a situation where the location information device 101 is performing navigation to a destination set by the user. Driving 242 indicates a state in which the vehicle equipped with which the location information device 101 is traveling.

API access 350 indicates restrictions on access to the API provided by the location information device 101. API access restrictions in this example are defined as follows:

A . . . access is permitted

C . . . access is prohibited

External access 360 defines a restriction applied to external access when the relevant widget 110 is in operation. External access restrictions in this example are defined as follows:

A . . . external access is permitted without any restrictions

B . . . only access to the download source is permitted

FIGS. 3A and 3B are diagrams illustrating user information that is managed by the widget management portal 102. FIG. 3A is an explanatory diagram illustrating an example of the user basic information 153 managed by the widget management portal 102.

In the user basic information 153 of FIG. 3A, each entry is constituted of a user ID field for storing the identifier of a user of the location information device 101, a device type identification number field for storing an identifier that indicates the device type of the location information device 101, an available widget recording capacity (kB) field for storing the capacity of the location information device 101 that is available to store the widgets 110, and a field for an installed widget list 410 where a list of the widgets 110 already installed in the location information device 101 is stored.

The user basic information 153 is basic information of each user who owns the location information device 101.

The installed widget list 410 is a list of the widgets 110 installed in the location information device 101 that is owned by the user in question. In the case of the widget 110 that has been provided by the widget management portal 102, identification information (an ID) of the widget 110 is recorded in the field for the installed widget list 410. In the case of the widget 110 that has not been provided by the widget management portal 102 (namely, the widget 110 that has been downloaded from one of the third-party sites 103), a name by which the widget 110 can uniquely be identified is written in the field for the installed widget list 410.

FIG. 3B is an explanatory diagram illustrating an example of the user terminal load history 154 managed by the widget management portal 102. The user terminal load history 154 of FIG. 3B is data recording, in descending order of maximum load, a plurality of states in which a maximum load is recorded on the location information device 101 that is owned by the user in question. These pieces of information are collected from the location information device 101 by the widget management portal 102 when the location information device 101 is coupled to the widget management portal 102, and are used to update the user terminal load history 154. A maximum load is the maximum value within a given period of time.

In the user terminal load history 154, each entry is constituted of a user ID field for storing the identifier of a user of the location information device 101, a recorded date/time field for storing a date/time at which the maximum load has been updated, a location (longitude, latitude) field for storing the longitude and latitude of a location where the maximum load has been updated, a field for a CPU utilization ratio 420 where the utilization ratio of the CPU 131 is stored, an available memory capacity (kB) field for storing the free capacity of the memory 132, a field for a load amount 422 where a load index is stored, and a field for a running widget list 323 where a list of the widgets 110 that have been in operation at the time the maximum load is recorded is stored.

The load amount 422 is the sum of load indices of the widgets 110 that have been run on the location information device 101 at the recorded date/time.

FIG. 4 is a diagram illustrating the widget management information 142, which is stored in the recording device 140 of the location information device 101.

In the widget management information 142 of FIG. 4, each entry is constituted of a widget ID, widget set values 510, and a current state 520. As the widget ID, the identifier of one widget 110 is stored. The widget set values 510 include a load index 511, and an execution priority 512 of the widget 110. The current state 520 indicates an operation restriction 521 applied to the widget 110 in terms of display.

The widget set values 510 are basic attributes of the widget 110 that has been downloaded. The basic attributes are constituted of the load index 511 and the execution priority 512. The load index 511 is an index of a load necessary for the widget 110 to operate. The execution priority 512 is a priority level at which the widget 110 is executed, and a smaller figure indicates a higher priority level. When the load on the location information device 101 increases, operation restrictions are imposed on the widgets 110 starting from the widget 110 that has the lowest execution priority 512. The assigned priority level may be varied depending on the state of the location information device 101.

As the current state 520, the current display state and the current operation restriction situation are recorded for each widget 110. An example of different display states is as follows:

Displayed: normal display

Iconized: only the function of the widget 110 is active

Icon displayed, widget not running: the icon of the widget 110 is displayed on the display 133 but the widget 110 is not in operation Not displayed: the widget 110 is not displayed on the display 133

As the operation restriction 521, specifics of an operation restriction currently set to the widget 110 are stored.

In the case of the widget 110 that has been provided by the widget management portal 102, identification information (an ID) of the widget 110 is recorded as the widget ID of the widget management information 142. In the case of the widget 110 that has been downloaded from one of the third-party sites 103, a name by which the widget 110 can uniquely be identified is written as the widget ID.

FIG. 5 is an explanatory diagram illustrating the widget-library association table 124 of the location information device 101, and is an example of a table for managing the association between the widgets 110 and libraries.

The widget-library association table 124 shows, for each widget 110 downloaded in the location information device 101 at present, the relation between the widget 110 and a library within the location information device 101 that is used by the widget 110. Libraries are interfaces for providing the respective functions of the location information device 101.

Each entry of the widget-library association table 124 is constituted of a widget ID and an I/F Ver. 502 of each relevant library.

The I/F Ver. 502 is the I/F version of each relevant library. As illustrated in an area 503, when one widget 110 is to use a library, a library version number associated with this widget 110 is set. The widget 110 cannot use the library when the I/F version of the library does not match the library version associated with the widget 110. In the case where the version number does not match, an alert may be displayed to the user or other actions may be taken.

FIG. 6 is an explanatory diagram illustrating the library operation history table 126 of the location information device 101.

The library operation history table 126 holds the identifier of a library and the identifier of a library that has been executed immediately before the library in question, and entries are sorted in descending order of the average load of the CPU 131 that is observed when a library is run on the location information device 101. The widget management module 120 uses the library operation history table 126 to predict the load on the location information device 101 and restrict the operation of the widgets 110.

Each entry of the library operation history table 126 of FIG. 6 is constituted of a field for a history number 602 where a history identifier is stored, a field for a library operation pattern 603 where the operation state of a library is stored, and a field for an average CPU load 604 where the average load (%) of the CPU 131 is stored.

The library operation pattern 603 indicates relevance in the order of running libraries, and includes a heavy load library ID, which is the identifier of a library high in the utilization ratio (load) of the CPU 131, the ID of a library that has been executed immediately before the library having the heavy load library ID, and an average execution time. The average CPU load (%) 604 is an average value of the utilization ratio of the CPU 131 within a given period of time. When a library is to be activated, the widget management module 120 checks whether or not the identifier of the library to be activated is registered in the library operation history table 126, as a way to predict the operating load of the location information device 101. In the case where the identifier of the library to be activated is registered as a previous library in the library operation history table 126, the execution time is monitored and the operation of the relevant widget 110 may be restricted at the time the average execution time is exceeded. This prevents a situation where the location information device 101 lacks resources when a heavy load library starts running.

Figure 7:
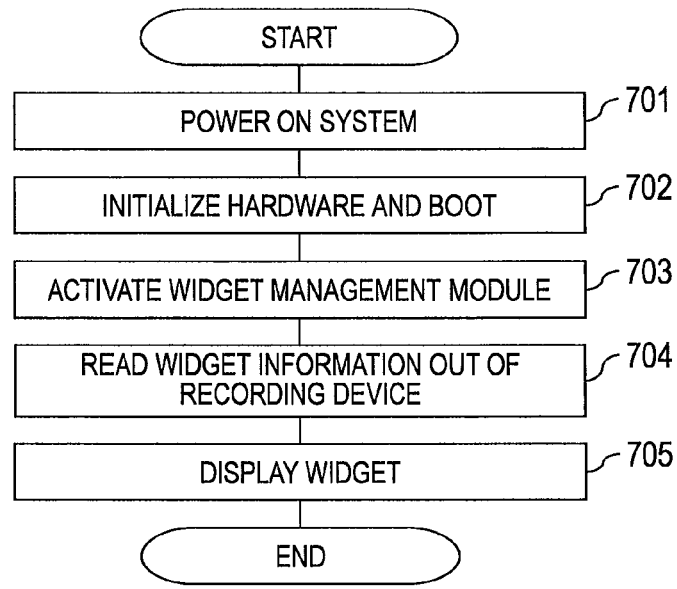
FIG. 7 is a flow chart illustrating processing that is executed at the time the location information device is booted.

FIG. 7 is a flow chart illustrating processing that is executed at the time the location information device 101 is booted.

Step 701 is processing of powering the location information device 101 on.

Step 702 is processing of initializing the hardware 130 of the location information device 101 and booting the OS 129, the navigation engine 127, and the library group 128.

Step 703 is processing of activating the widget management module 120.

Step 704 is processing of reading the widget management information 142 out of the recording device 140.

Step 705 is processing of displaying the widgets 110 on the display 133.

Figure 8:
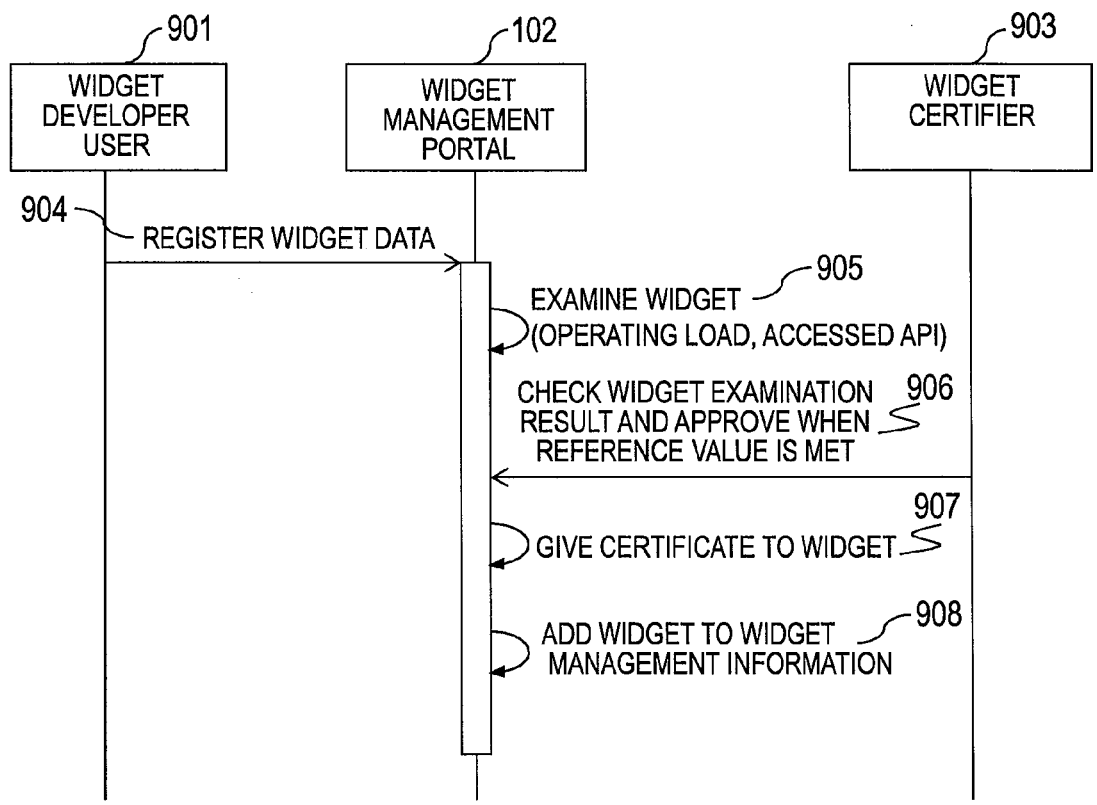
FIG. 8 is a sequence diagram illustrating an example of procedure of registering the widget that has been created by a developer to the widget management portal.

FIG. 8 is a sequence diagram illustrating an example of procedure of registering the widget 110 that has been created by a developer to the widget management portal 102.

In FIG. 8, a developer user 901 of the widget 110 operates a not-shown computer to couple the computer to the widget management portal 102 via the network 104. A registered widget certifier 903 approves the widget 110 registered to the widget management portal 102.

First, the widget developer user 901 transmits data of the widget 110 to the widget management portal 102 and registers the widget 110 to the widget management portal 102 (Step 904).

Next, the widget management portal 102 performs processing of examining the registered widget 110 (an inspection on the operating load, an accessed API, and the like) (Step 905).

Subsequently, the registered widget certifier 903 couples a not-shown computer to the widget management portal 102 via the network 104 to check examination results of the widget 110 and, when the results meet given reference values, approves the widget 110 (Step 906).

The widget management portal 102 then performs processing of attaching a certificate to the widget 110 (Step 907). Lastly, the widget management portal 102 performs processing of adding the widget 110 to the widget management information 152 (Step 908).

Figure 9:
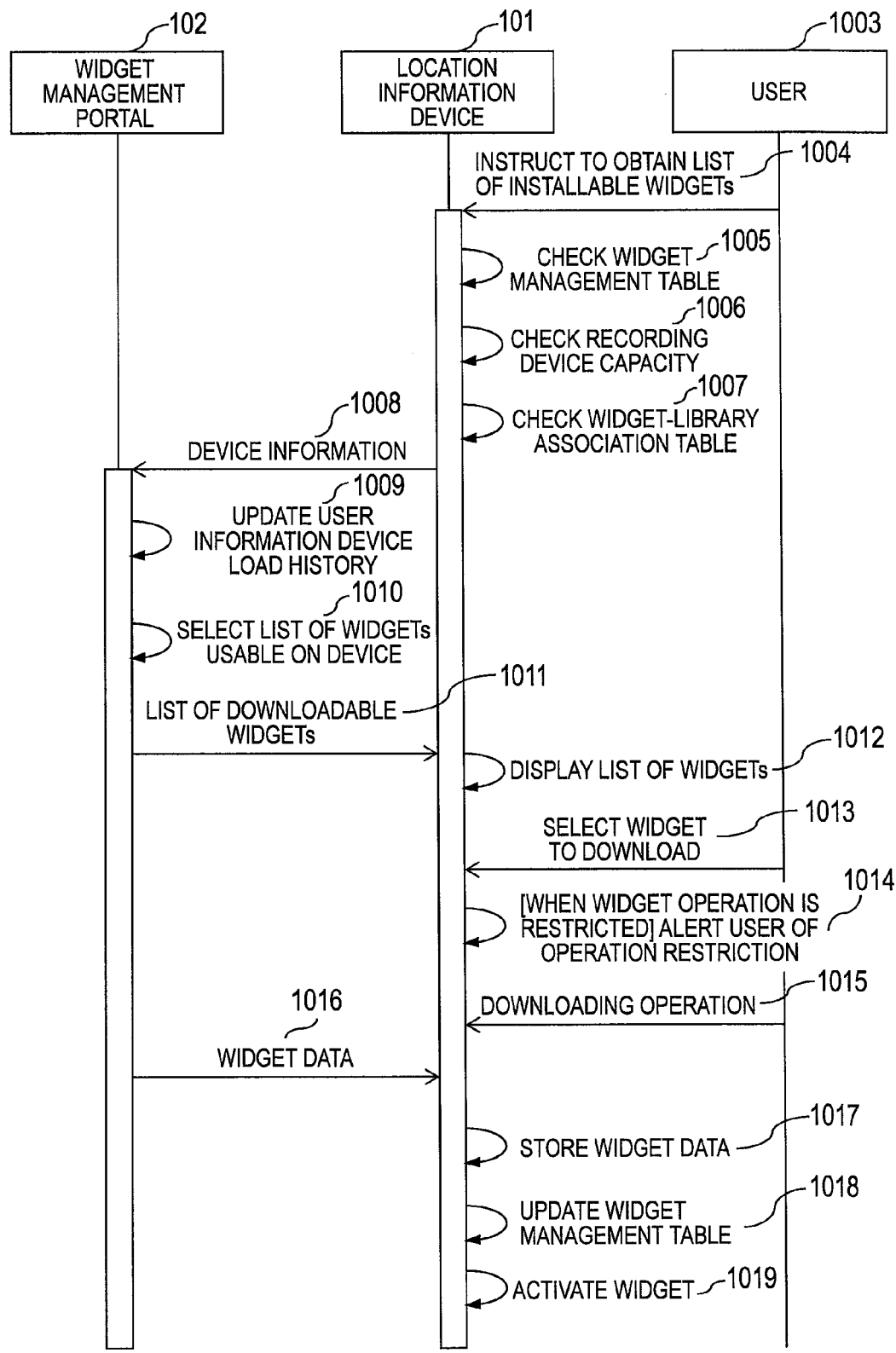
FIG. 9 is a sequence diagram illustrating the flow of installing one of the widgets from the widget management portal 102 in the location information device over the network.

FIG. 9 is a sequence diagram illustrating the flow of installing one of the widgets 110 from the widget management portal 102 in the location information device 101 over the network. In FIG. 9, a symbol 1003 represents a user.

The widget management portal is denoted by 102, the location information device is denoted by 101, and the user is denoted by 1003.

First, the user 1003 transmits to the location information device 101 an instruction to obtain a list of the widgets 110 that can be installed in the location information device 101 (Step 1004).

Next, the location information device 101 checks the widget management table 122 (Step 1005), checks the capacity of the recording device 140 (Step 1006), and checks the widget-library association table 124 (Step 1007).

The location information device 101 then transmits to the widget management portal 102 terminal information which includes the identifier, the user ID, a load history, and the widget management table 122 of the terminal 101, to thereby make a request to the widget management portal 102 for a list of the downloadable widgets 110 (Step 1008).

The widget management portal 102 updates the user device load history 154 based on the load history received from the location information device 101 (Step 1009). The widget management portal 102 refers to the widget management table 122 included in the received request to select and list the widgets 110 that can be used on the location information device 101 (Step 1011).

The widget management portal 102 next transmits to the location information device 101 the list of the widgets 110 that can be downloaded to the location information device 101 (Step 1011).

The location information device 101 displays on the display 133 the list of the downloadable widgets 110 which has been received from the widget management portal 102 (Step 1012).

The user 1003 selects the widget 110 to download on the location information device 101 (Step 1013).

The location information device 101 refers to the widget management information 152 of the widget management portal 102 to determine whether or not the operation restriction 225 is set to the download target widget 110. In the case where the operation of the widget 110 is restricted, the location information device 101 alerts the operation restriction to the user (Step 1014). The user 1003 then executes on the location information device 101 an operation of downloading the selected widget 110 from the widget management portal 102 (Step 1015).

The widget management portal 102 transmits data of the specified widget 110 to the location information device 101 (Step 1016).

The location information device 101 stores the data of the widget 110 received from the widget management portal 102 in the memory 132 or the recording device 140 (Step 1017). The location information device 101 next updates the widget management table 122 and the widget management information 142 by adding information of the downloaded widget 110 (Step 1018). The location information device 101 lastly activates the downloaded widget 110 (Step 1019). When activating the widget 110, the location information device 101 adds an entry for this widget 110 to the widget management information 142, and sets the execution priority 512 and the operation restriction 521 based on the operation policy 115.

Figure 10A:
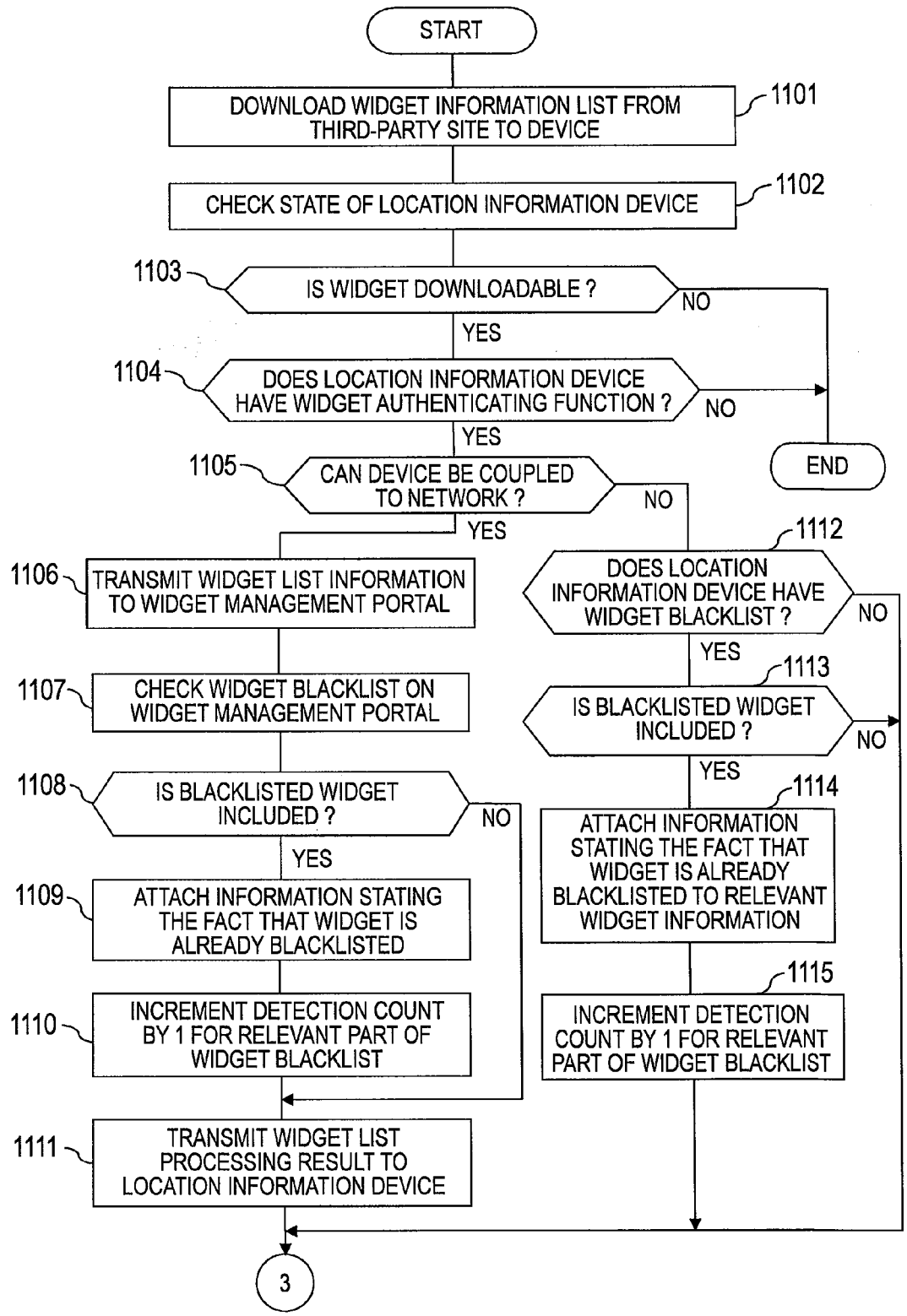
FIG. 10A is a flow chart illustrating a flow in which the location information device downloads one widget from a third-party site.
Figure 10B:
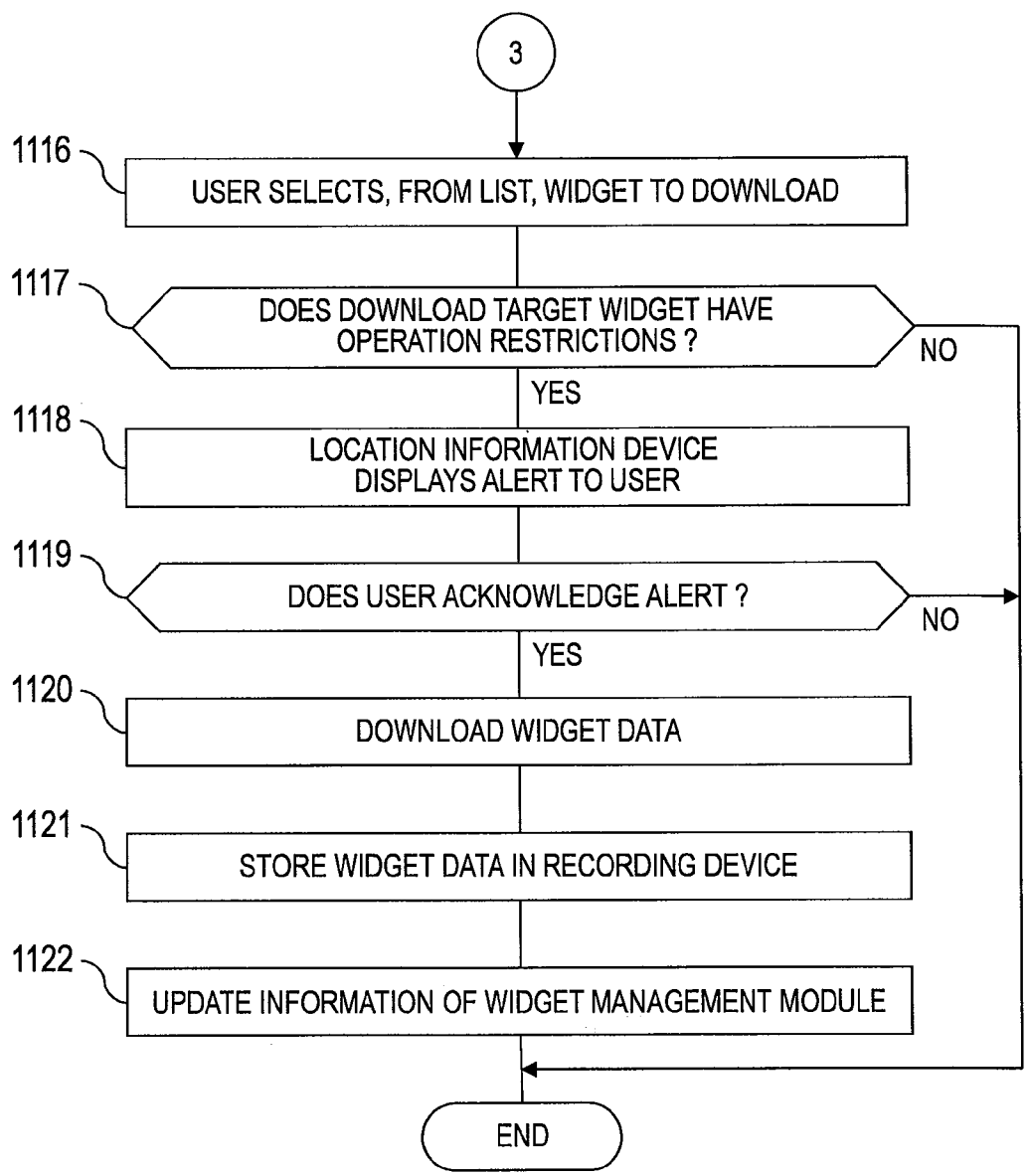
FIG. 10B is a flow chart illustrating a flow in which the location information device downloads one widget from a third-party site.

FIGS. 10A and 10B are flow charts illustrating a flow in which the location information device 101 downloads one widget 110 from a third-party site.

The location information device 101 first downloads a list of the widgets 110 from a third-party site (Step 1101). The third-party sites 103 can be distinguished from the widget management portal 102 by their URLs or IP addresses.

The state of the location information device 101 is then checked (Step 1102).

Thereafter, the location information device 101 checks whether or not the widget 110 specified by the user can be downloaded (Step 1103). For example, the location information device 101 determines whether or not the recording device 140 where the widgets 110 are stored has a free capacity larger than the capacity of the specified widget 110. In the case where the specified widget 110 can be downloaded, the processing proceeds to Step 1004. In the case where the specified widget 110 cannot be downloaded, on the other hand, the processing is ended.

Whether or not the location information device 101 is equipped with a function of authenticating the widgets 110 is determined (Step 1104). In the case where the location information device 101 has a function of authenticating the widgets 110, the processing proceeds to Step 1105. In the case where the location information device 101 does not have a function of authenticating the widgets 110, on the other hand, this processing is ended.

In Step 1105, whether or not the location information device 101 can be coupled to the network 104 is determined. In the case where the location information device 101 can be coupled to the network 104, the processing proceeds to Step 1106. In the case where the location information device 101 cannot be coupled to the network 104, on the other hand, the processing proceed to Step 1112.

In Step 1106, the location information device 101 transmits to the widget management portal 102 information on the list of the widgets 110 which has been received from the third-party site 103.

The widget management portal 102 compares the information on the list of the widgets 110 of the third-party site 103 which has been received from the location information device 101 against the widget blacklist 155 (Step 1107).

Thereafter, the widget management portal 102 determines whether or not the widget 110 that is listed on the widget blacklist 155 is found in the information on the list of the widgets 110 of the third-party site 103 (Step 1108). In the case where the information on the list of the widgets 110 of the third-party site 103 includes the widget 110 listed on the widget blacklist 155, the processing proceeds to Step 1109. In the case where the information on the list of the widgets 110 of the third-party site 103 does not include the widget 110 listed on the widget blacklist 155, on the other hand, the processing proceeds to Step 1111.

In Step 1109, the widget management portal 102 attaches information stating the fact that the widget 110 is already blacklisted to the reliability 116 of the relevant widget 110.

Thereafter, the widget management portal 102 increments the detection count by 1 for the relevant part of the widget blacklist 155 (Step 1110).

In Step 1111, the widget management portal 102 transmits the result of comparing the information on the list of the widgets 110 of the third-party site 103 against the widget blacklist 155 to the location information device 101.

In Step 1112, whether or not the location information device 101 has the widget blacklist 121 is determined. In the case where the location information device 101 has the widget blacklist 121, the processing proceeds to Step 1113. In the case where the location information device 101 does not have the widget blacklist 121, on the other hand, the processing proceeds to Step 1116.

In Step 1113, the location information device 101 determines whether or not the information on the list of the widgets 110 which has been received from the third-party site 103 includes the widget 110 that is listed on the widget blacklist 121. In the case where the information on the list of the widgets 110 which has been received from the third-party site 103 includes the widget 110 that is listed on the widget blacklist 121, the processing proceeds to Step 1114. In the case where the information on the list of the widgets 110 which has been received from the third-party site 103 does not include the widget 110 that is listed on the widget blacklist 121, on the other hand, the processing proceeds to Step 1116.

In Step 1114, information stating the fact that the widget 110 is already blacklisted is attached to the reliability 116 of the relevant widget 110.

Thereafter, the location information device 101 increments the detection count by 1 for the relevant part of the widget blacklist 121 (Step 1115).

In Step 1116, the location information device 101 outputs to the display 133 the list of the widgets 110 of the third-party site 103, and the user selects on the display 133 the widget 110 to download.

Next, the location information device 101 determines whether or not an operation restriction is imposed on the widget 110 that is about to be downloaded (Step 1117). In the case where an operation restriction is imposed on the widget 110 that is about to be downloaded, the processing proceeds to Step 1118. In the case where no operation restriction is imposed on the widget 110 that is about to be downloaded, on the other hand, this processing is ended.

In Step 1118, the location information device 101 displays an alert to notify the user of the fact that an operation restriction is applied to the download target widget 110.

The location information device 101 next determines whether or not the user has acknowledged the alert (Step 1119). In the case where the user acknowledges the alert, the processing proceeds to Step 1120. In the case where the user does not acknowledge the alert, on the other hand, this processing is ended.

In Step 1120, the location information device 101 downloads data of the target widget 110 from the third-party site 103.

Thereafter, the location information device 101 stores the downloaded data of the widget 110 in the recording device 140 (Step 1117).

The location information device 101 updates the widget management table 122 of the widget management module 120 by adding information of the downloaded widget 110 (Step 1122).

Through the processing described above, when the location information device 101 downloads the widget 110 that is provided by one of the third-party sites 103, the unauthorized widgets 110 are detected by referring to the widget blacklist of the location information device 101 or the widget blacklist of the widget management portal 102. The blacklist imposes operation restrictions on the unauthorized widgets 110, and hence notifying the user of the fact that an operation restriction is applied lets the user know that the widget 110 in question is unauthorized.

Figure 11:
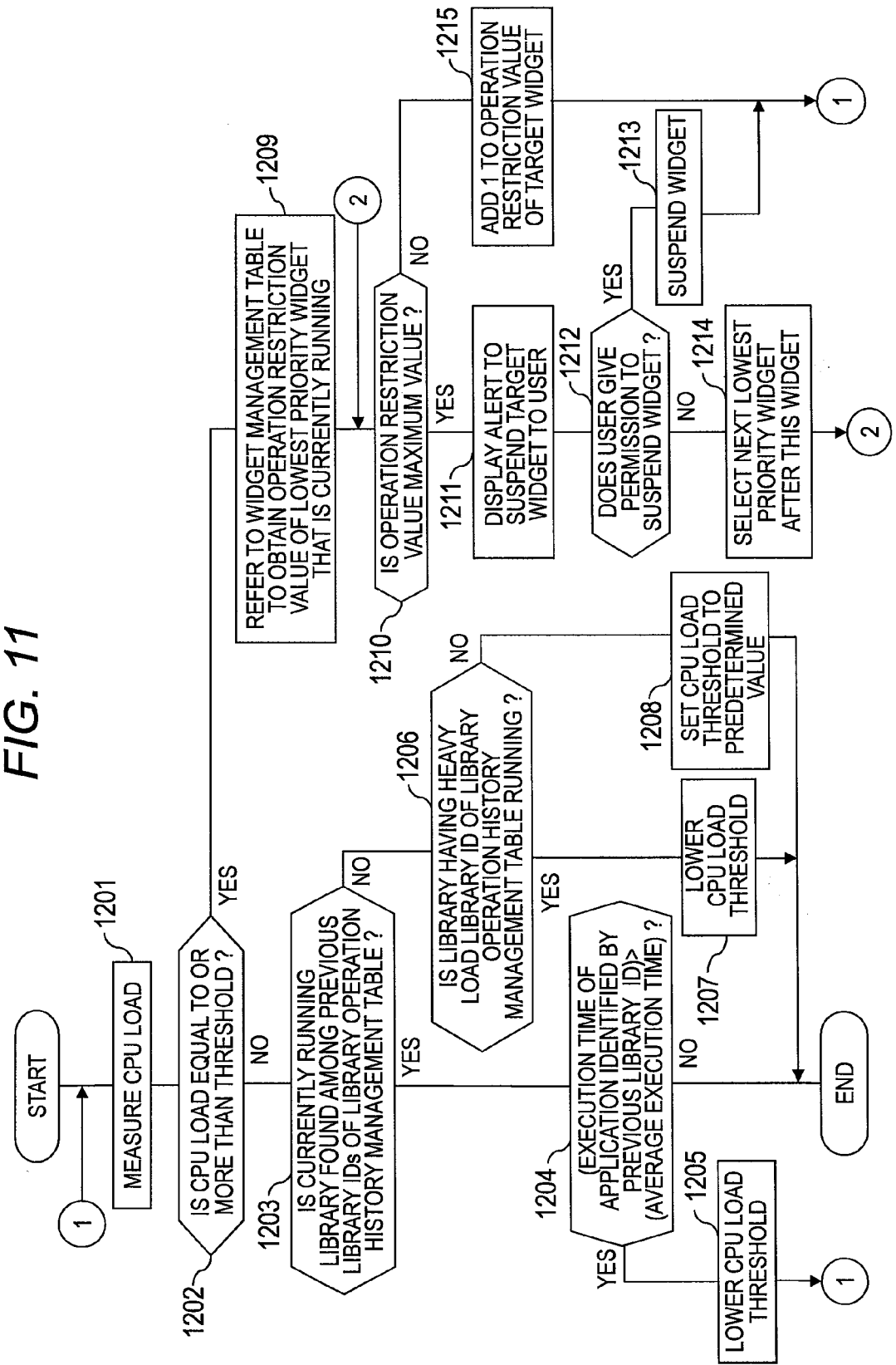
FIG. 11 is a flow chart illustrating an example of operation restrictions applied to the widgets in a manner that suits the state of the location information device.

FIG. 11 is a flow chart illustrating an example of operation restrictions applied to the widgets 110 in a manner that suits the state of the location information device 101. This processing is executed when the widget 110 on which an operation restriction is imposed is executed.

The location information device 101 first measures the load of the CPU 131 (Step 1201).

Thereafter, the location information device 101 determines whether or not the load of the CPU 131 is equal to or more than a threshold (Step 1202). In the case where the measured load of the CPU 131 is equal to or more than the threshold, the processing proceeds to step 1209. In the case where the measured load of the CPU 131 is not equal to or more than the threshold, on the other hand, the processing proceeds to step 1203. The threshold is, for example, a fixed value set for each device type of the location information device 101 separately, or may be dynamically changed depending on what libraries and widgets 110 are installed. The threshold may also be a value obtained from the widget concurrent executability threshold 214 of the location information device management information 151 of the widget management portal 102. The widget concurrent executability threshold 214 may be obtained when the location information device 101 is coupled to the widget management portal 102.

In Step 1203, the location information device 101 determines whether or not a library currently running on the location information device 101 is found among previous library IDs of the library operation history table 126 (Step 1203). In the case where a currently running library is already registered as a previous library ID of the library operation history table 126, the processing proceeds to Step 1204. In the case where a currently running library is not registered as a previous library ID of the library operation history table 126, on the other hand, the processing proceeds to Step 1206.

In Step 1204, the location information device 101 determines whether or not the execution time of the library identified by the previous library ID exceeds the average execution time of the library operation history table 126. In the case where the execution time of the library identified by the previous library ID exceeds the average execution time of the library operation history table 126, the processing proceeds to Step 1205. Otherwise, this processing is ended.

In Step 1205, the threshold for the load of the CPU 131 is lowered. For example, a fixed value is set as a threshold for the load of the CPU 131 for each device type of the location information device 101 separately, and the fixed value is reduced by a given value (e.g., by 10%) at a time within a range in which the load of the CPU 131 including that of the running library meets the load threshold described above.

In Step 1206, the location information device 101 determines whether or not a library identified by a heavy load library ID of the library operation history table 126 is in operation. In the case where a library identified by a heavy load library ID is in operation, the processing proceeds to Step 1207. In the case where a library identified by a heavy load library ID is not in operation, the processing proceeds to Step 1208.

In Step 1207, the location information device 101 lowers the threshold for the load of the CPU 131. This processing can be carried out by a method similar to that of Step 1205 described above.

In Step 1208, the threshold for the load of the CPU 131 is set to a default value.

In Step 1209, the location information device 101 refers to the widget management information 142 to obtain the operation restriction value 521 of the widget 110 that is lowest in the execution priority 512 among the currently running widgets 110.

Thereafter, the location information device 101 checks whether or not the operation restriction value 521 is the maximum value (Step 1210). In the case where the operation restriction value 521 is the maximum value, the processing proceeds to Step 1211. In the case where the operation restriction value 521 is not the maximum value, the processing proceeds to Step 1215.

In Step 1211, an alert about the suspension of the widget 110 that is lowest in the execution priority 512 is displayed to the user.

Thereafter, the location information device 101 determines whether or not the user has permitted the suspension of the widget 110 that is lowest in the execution priority 512 (Step 1212). In the case where the user permits the suspension of the widget 110 that is lowest in the execution priority 512, the processing proceeds to Step 1213. In the case where the user does not permit the suspension of the widget 110 that is lowest in the execution priority 512, on the other hand, the processing proceeds to Step 1214.

In Step 1213, the widget 110 that is lowest in the execution priority 512 is suspended.

In Step 1214, the widget 110 on the location information device 101 that has the lowest priority after the suspended widget 110 is selected.

In Step 1215, 1 is added to the operation restriction value of the widget 110 that has been obtained in Step 1209.

Through the processing described above, when the load of the CPU 131 of the location information device 101 increases, the widgets 110 that have low execution priority are suspended sequentially to ensure that processing of a widget that is high in the execution priority 512 is executed successfully.

Figure 12A:
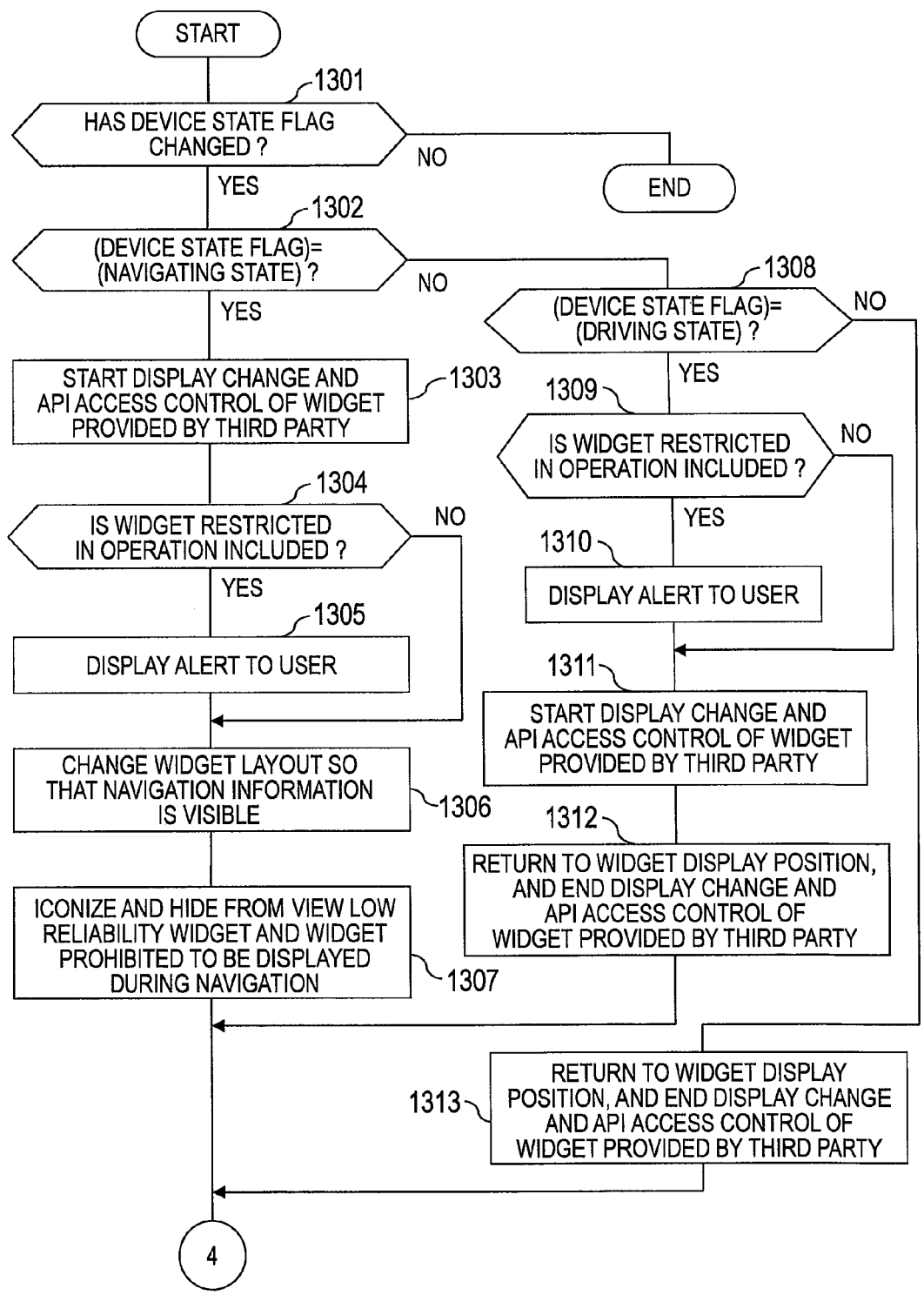
FIG. 12A is a flow chart illustrating processing of the widgets executed on the location information device.
Figure 12B:
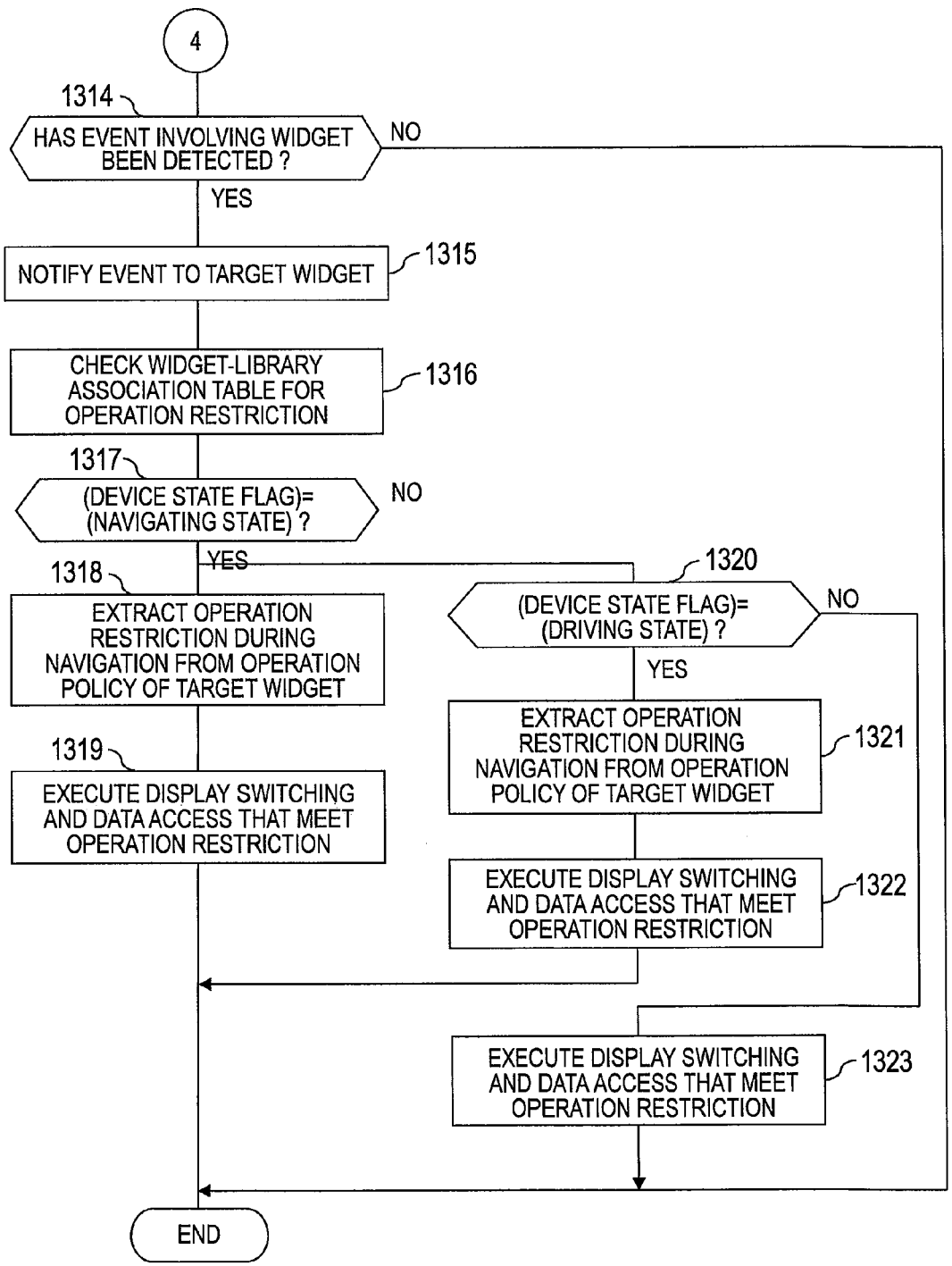
FIG. 12B is a flow chart illustrating processing of the widgets executed on the location information device.

FIGS. 12A and 12B are flow charts illustrating processing of the widgets 110 executed on the location information device 101, and illustrate the processing flow of the operation of the widgets 110 that is suited to the state of the location information device 101.

First, whether or not the device state flag 125 has changed is determined (Step 1301). In the case where the value of the device state flag 125 has changed, the processing proceeds to Step 1302. In the case where the value of the device state flag 125 has not changed, on the other hand, this processing is ended.

Thereafter, whether or not the device state flag 125 indicates a navigating state is determined (Step 1302). In the case where the device state flag 125 indicates a navigating state, the processing proceeds to Step 1303. In the case where the device state flag 125 does not indicate a navigating state, on the other hand, the processing proceeds to Step 1308.

In Step 1303, the location information device 101 starts display change of the widget 110 that has been downloaded from one of the third-party sites 103 (a widget provided by a third party) and control of access to an API.

Thereafter, whether or not there is the widget 110 that is to be restricted in operation is determined (Step 1304). In the case where the widget 110 whose operation is to be restricted is included, the processing proceeds to Step 1305. In the case where the widget 110 whose operation is to be restricted is not included, on the other hand, the processing proceeds to Step 1306.

In Step 1305, the user is alerted of the presence of the widget 110 that is to be restricted in operation.

In Step 1306, the arrangement or layout of the widgets 100 is changed so that navigation information is visible to the user on the display 133. In the case where navigation information and the widgets 110 are superimposed on each other, this processing changes the display positions of the widgets 110 to places where the widgets 110 do not overlap the navigation information. Alternatively, the display sizes of the widgets 110 are changed to sizes that do not overlap the navigation information. The navigation information is information that is output by the navigation engine 127 to the display 133 together with the map information 141 to suggest a traveling direction and guide the user to a destination set by the user.

In Step 1307, the widget 110 that is low in the reliability 116 and the widget 110 to which the action restriction 521 having attributes for prohibiting display during navigation is set are iconized and hidden from view, respectively, in accordance with the operation policy 115. Display prohibition attributes of the widget 110 that is currently run can be determined by referring to the operation restriction 521 of the widget management information 142 and the operation restriction definition 204. The operation restriction definition 204 can be obtained when the location information device 101 is coupled to the widget management portal 102.

In Step 1308, whether or not the device state flag 125 indicates a driving state is determined. In the case where the value of the device state flag 125 indicates a driving state, the processing proceeds to Step 1309. In the case where the value of the device state flag 125 does not indicate a driving state, on the other hand, the processing proceeds to Step 1313.

In Step 1309, whether or not there is the widget 110 that is to be restricted in operation is determined. In the case where the widget 110 whose operation is to be restricted is included, the processing proceeds to Step 1310. In the case where the widget 110 whose operation is to be restricted is not included, on the other hand, the processing proceeds to Step 1311.

In Step 1310, the user is alerted of the presence of the widget 110 that is to be restricted in operation.

In Step 1311, the location information device 101 starts display change of the widget 110 that has been provided by one of the third-party sites 103 and control of access to an API.

Thereafter, the widget 110 that is low in the reliability 116 and the widget 110 that has attributes for prohibiting display during navigation are iconized and hidden from view, respectively (Step 1312).

In Step 1313, when the device state flag 125 indicates "not running", the display position of the widget 110 is returned, and the location information device 101 ends the display change of the widget 110 that has been provided by a third party and the control of access to the API.

The location information device 101 then determines whether or not an event involving the widget 110 has been detected (Step 1314). In the case where an event involving the widget 110 has been detected, the processing proceeds to Step 1315. In the case where an event involving the widget 110 has not been detected, this processing is ended.

In Step 1315, the display change target widget 110 which is changed in the way it is displayed is notified of the event.

Thereafter, the widget-library association table 124 is used to determine whether or not an operation restriction is applied to the display change target widget 110 (Step 1316).

Step 1317 is followed by Step 1318 in the case where a result of the determination in Step 1316 shows that the device state flag 125 indicates a navigating state. In the case where the device state flag 125 does not indicate a navigating state, on the other hand, Step 1317 is followed by Step 1320.

In Step 1318, an operation restriction applied during navigation is extracted from the operation policy 115 of the display change target widget 110. The operation policy 115 can refer to the operation restriction 521 of the widget management information 142.

Thereafter, display switching and data access that meet the operation restriction of the widget 110 are executed (Step 1319).

In Step 1320, whether or not the device state flag 125 indicates a driving state is determined. In the case where the device state flag 125 indicates a driving state, the processing proceeds to Step 1321. In the case where the device state flag 125 does not indicate a driving state, the processing proceeds to Step 1323.

In Step 1321, an operation restriction during navigation is extracted from the operation policy 115 of the target widget 110.

Thereafter, display switching and data access that meet the operation restriction of the widget 110 are executed (Step 1322).

In Step 1323, display switching and data access that meet the operation restriction of the widget 110 are executed.

Through the processing described above, in a navigating state in which the navigation engine 127 is displaying navigation information, it is ensured that the navigation information is presented to the user by hiding the widgets 110 from view or iconizing the widgets based on operation restrictions of the widget management information 142, or by changing the display positions of the widgets 110. In addition, in a driving state in which the navigation engine 127 is displaying the map information 141 and the current location, the current location is presented to the user with precision by changing the way the widget 110 that has been downloaded from one of the third-party sites 103 is displayed. Furthermore, in a navigating state or a driving state, an overload of the CPU 131 is prevented by controlling access from the widgets 110 to APIs, and it is thus ensured that the map information 141 and other types of information that the user needs are presented.

In a driving state, display of the widget 110 downloaded from the widget management portal 102 which has been authenticated is permitted, whereas display of the widget 110 downloaded from one of the third-party sites 103 which has not been authenticated is controlled. This prevents the widget 110 downloaded from one of the third-party sites 103 whose behavior is unknown from overlapping the map information 141, the current location, and other types of information that the user needs, and thus ensures the reliability of the location information device 101.

Figure 13:
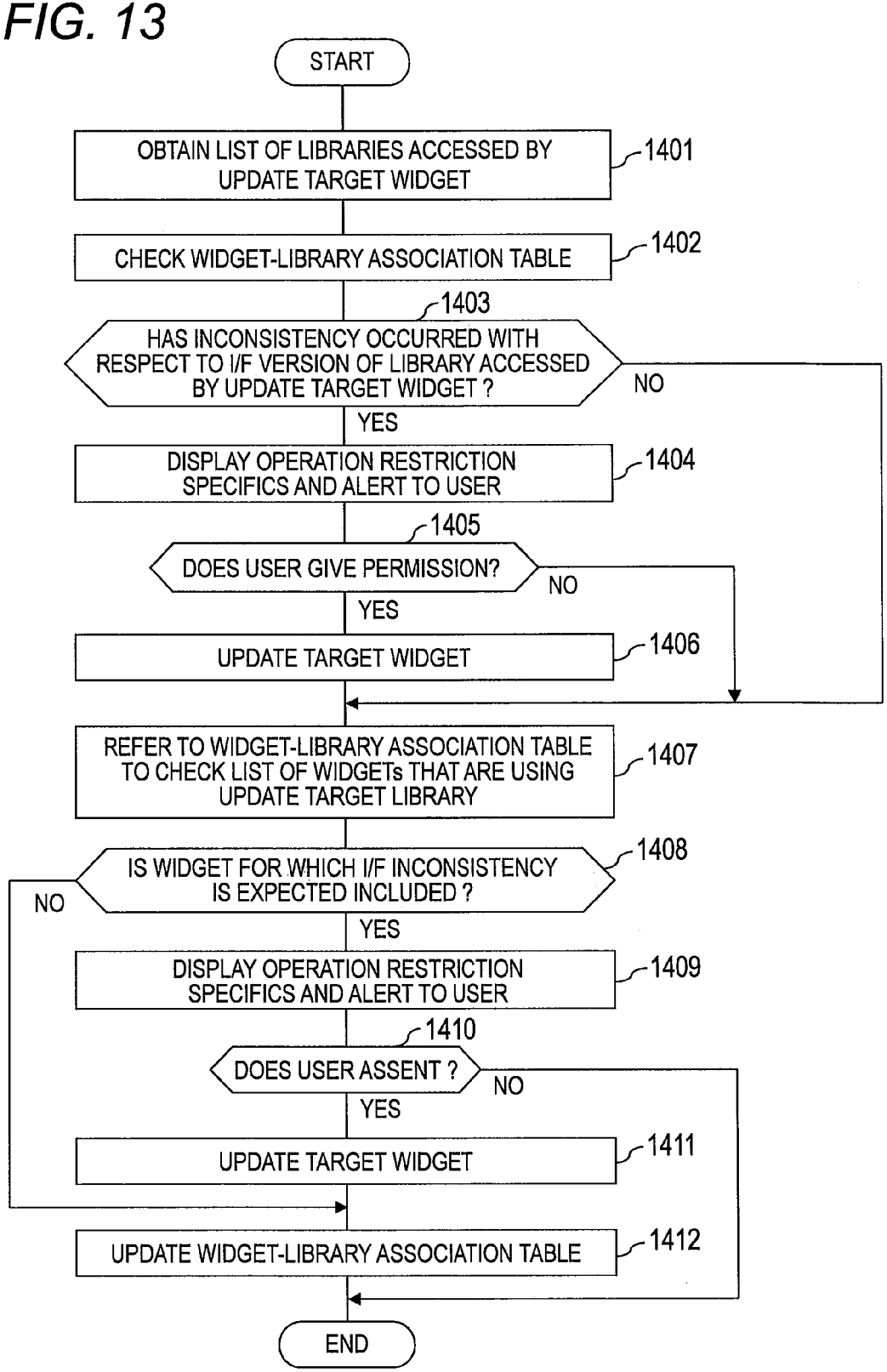
FIG. 13 is a flow chart illustrating processing that is executed when the widgets and libraries are updated.

FIG. 13 is a flow chart illustrating processing that is executed when the widgets 110 and libraries are updated.

The location information device 101 first obtains from the library group 128 a list of libraries accessed by the update target widget 110 (Step 1401).

The widget-library association table 124 is then checked in order to obtain the I/F Ver. 502 for each of the libraries (Step 1402).

The location information device 101 next determines whether or not there is inconsistency in the I/F versions of the libraries accessed by the update target widget 110 (Step 1403). In the case where an I/F version inconsistency is found, the processing proceeds to Step 1404. In the case where no I/F version inconsistency is found, on the other hand, the processing proceeds to Step 1407.

In Step 1404, because an operation restriction is applied to the execution of the widget 110 due to the I/F version inconsistency, specifics of the operation restriction and an alert are displayed to the user.

Thereafter, whether or not the user assents to the alert and the restriction specifics and permits an update is determined (Step 1405). In the case where the user permits an update, the processing proceeds to Step 1406. In the case where the user does not permit an update, on the other hand, the processing proceeds to Step 1407.

In Step 1406, the target widget 110 is updated. For example, the location information device 101 obtains an update program of the widget 110 from the widget management portal 102 and executes the obtained update program.

In Step 1407, the widget-library association table 124 is referred to in order to check a list of the widgets 110 that are using an update target library.

The location information device 101 then determines whether or not the widget 110 for which an I/F version inconsistency is expected is included (Step 1408). In the case where there is an I/F inconsistency, the processing proceeds to Step 1409. In the case where there is no I/F inconsistency, on the other hand, the processing proceeds to Step 1412.

In Step 1409, because an operation restriction is applied to the execution of the widget 110 due to the I/F version inconsistency, specifics of the operation restriction and an alert are displayed to the user.

Thereafter, whether or not the user assents to the alert is determined (Step 1410). In the case where the user assents to the operation restriction alert, the processing proceeds to Step 1411. In the case where the user does not assent to the operation restriction alert, on the other hand, this processing is ended.

In Step 1411, the widgets 110 that are using the update target library are updated. This processing can be carried out by a method similar to that of Step 1406 described above.

In Step 1412, the library is updated and the widget-library association table 124 is updated.

Figure 14:
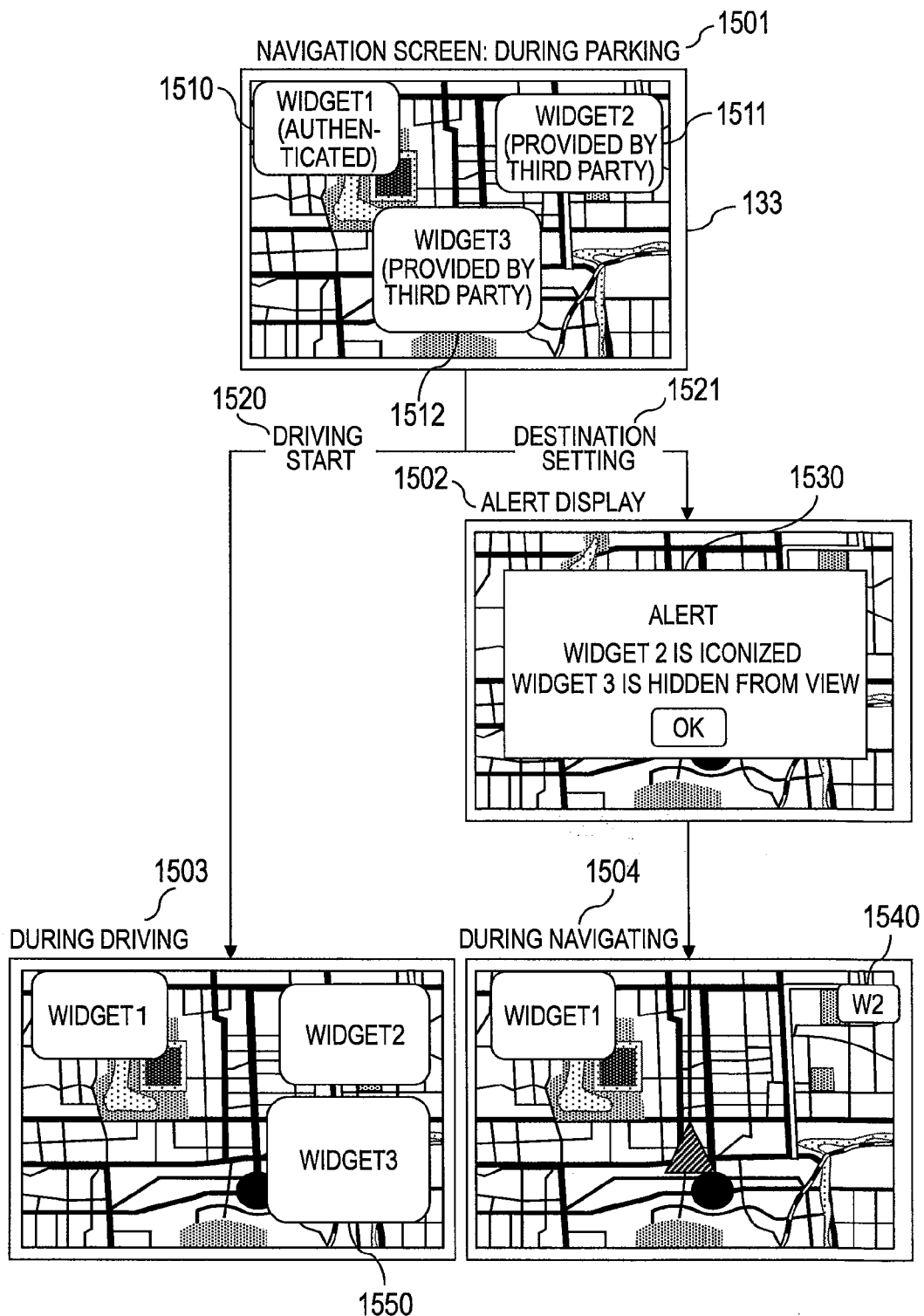
FIG. 14 is an explanatory diagram illustrating an example of display method changes that are executed when the state of the location information device is changed

FIG. 14 is an explanatory diagram illustrating an example of display method changes that are executed when the state of the location information device 101 is changed.

A parked-state screen 1501 of FIG. 14 which is displayed during parking includes an authenticated widget 1510, a widget 1511 provided by a third party, and a widget 1512 provided by a third party. Driving start 1520 causes the parked-state screen 1501 to shift to a driving-state screen 1503 which is displayed during driving. The parked-state screen 1501 also shifts to a navigating-state screen 1504, which is displayed during navigating, through an alert display screen 1502, which includes alert display 1530. While the alert display screen 1502 includes the alert display 1530, the navigating-state screen 1504 includes an iconized widget 1540.

During parking, all the widgets 110 are displayed on the display 133. When the location information device 101 starts traveling, the device state flag 125 changes to a driving state, settings in a driving state are read out of the operation policy 115 of each widget 110, and display control that conforms to the operation policy 115 is exercised. During driving, the widget 1511 which is positioned around the center of the screen is iconized and automatically moves to an edge of the screen so that the user can view map information with ease. In this example, a widget 1550 is moved to an edge of the screen.

When a destination is set while the location information device 101 is in a parked state and is displaying the widget 110 to which an operation restriction is applied in a navigating state, specifics of display control are displayed as the alert 1530 before the location information device 101 enters a navigating state. In this example, a widget 3 is not displayed during navigating and an alert informing that a widget 2 is iconized to expand the display range is displayed. The location information device 101 may employ a display method in which the alert is not displayed for the second and subsequent times.

Figure 15:
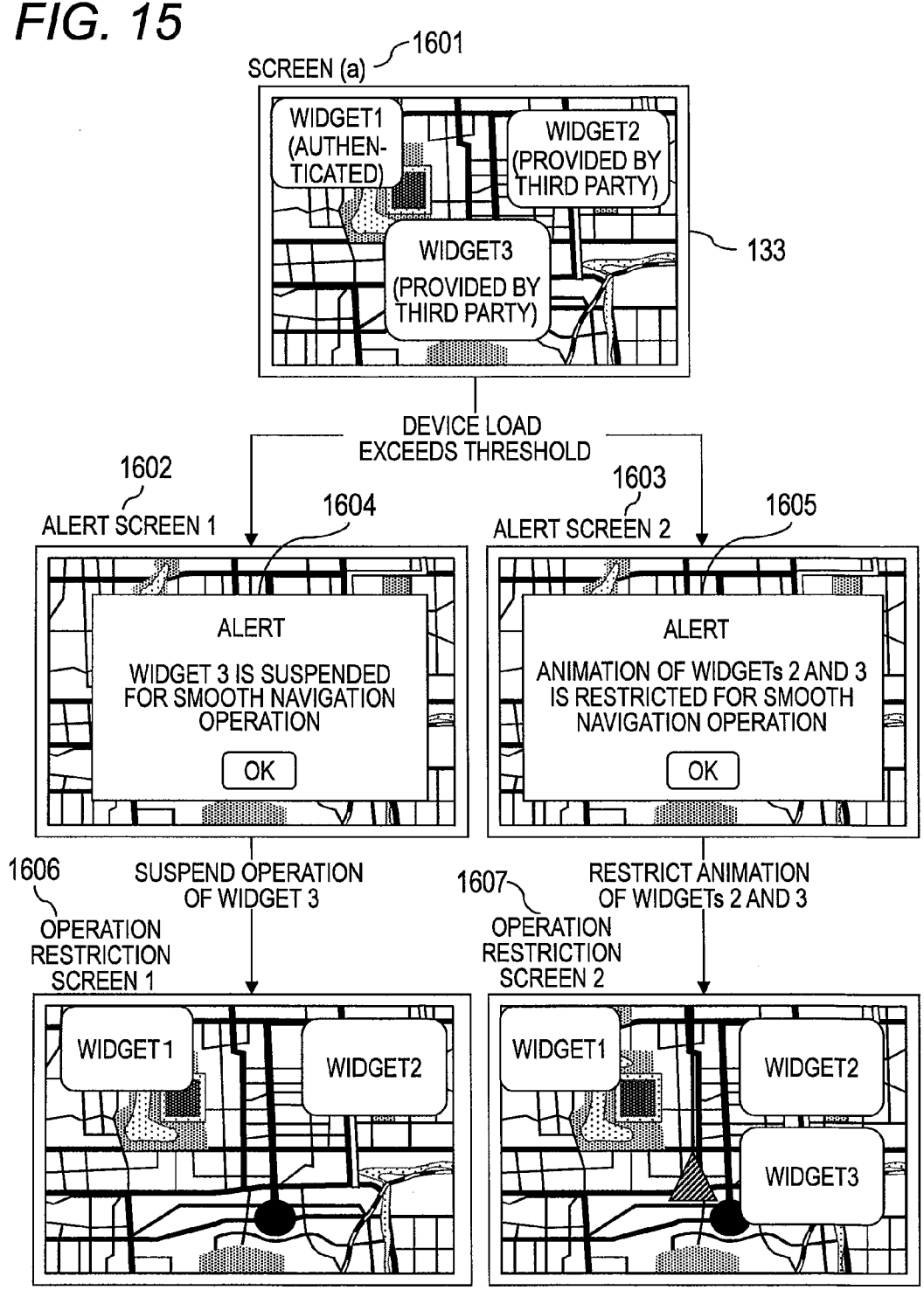
FIG. 15 is an explanatory diagram illustrating an example of what is displayed when the operating load of the location information device is heavy.

FIG. 15 is an explanatory diagram illustrating an example of what is displayed when the operating load of the location information device 101 is heavy.

In this example, a screen (a) 1601 is displayed during normal operation. When the load on the location information device 101 exceeds a threshold, the screen (1) 1601 turns into one of an alert screen 1 (1602) and an alert screen 2 (1603). Which of the alert screens is to be displayed is determined by how much larger the load of the CPU 131 is than the threshold.

The alert screen 1 (1602) includes an alert 1604 about suspending the operation of the widget 3.

The alert screen 2 (1603) includes an alert 1605 about restricting the animation operation of the widget 2 and the widget 3.

After the user checks these alerts, the alert screen 1 (1602) shifts to an operation restriction screen 1 (1606), and the alert screen 2 (1603) shifts to an operation restriction screen 2 (1607).

Figure 16:
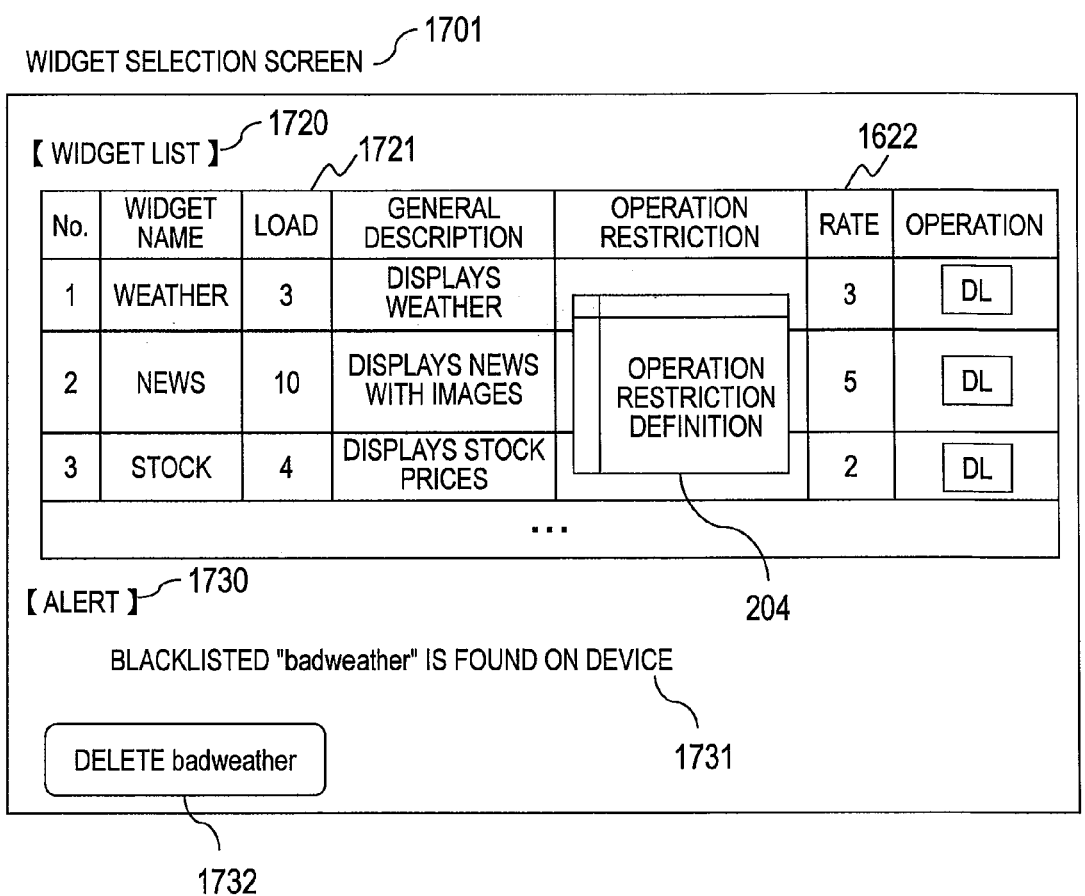
FIG. 16 is an example of a selection screen for downloading the widgets which is viewed by the user on the location information device when the user downloads the widgets.

FIG. 16 is an example of a selection screen 1701 for downloading the widgets 110 which is viewed by the user on the location information device 101 when the user downloads the widgets 110. Depending on the service used, this screen may be viewed on a not-shown computer to download the selected widget 110 to the location information device 101.

A widget list 1720 displays information about the widgets 110 that can be downloaded. A load 1721 is a maximum load that is registered when the widget 110 in question is executed, and is expressed in the form of load index.

A rate 1622 is an evaluation value of the widget 110 in question, and a larger value means a higher evaluation.

To give an example of how the widgets 110 are evaluated, an average value of evaluations from users who have downloaded the widget 110 in question may be displayed.

An alert 1730 is displayed when the widget 110 that is registered on the widget blacklist 155 is found on the location information device 101 owned by the user.

In a case where the user viewing the widget selection screen 1701 wishes to delete the target widget 110, the widget 110 can be deleted from the location information device 101 by operating a delete button 1732.

As has been described, according to this invention, the operation of a widget 110 can be restricted in a manner that conforms to the intention of the developer of the widget 110 when the widget 110 is run on the location information device 101 that does not have resources of the hardware 130 which are enough to run the widget 110 in its full capacity. The widget 110 is therefore prevented from deteriorating in appearance and usability. In addition, the way the widget 110 is displayed and the operation of the widget 110 are automatically controlled in a manner that suits the state of the location information device 101 (a navigating state, a driving state, and a stationary state), thereby automatically balancing the user's safety during navigation to a destination and the ease of operation of the widget 110. Moreover, because each widget itself has the operation policy 115 and the reliability parameter 116, the widget 110 that is unauthorized is prevented from running on the location information device 101 and the reliability of the location information device is thus ensured.

The widgets 100 in this example are controlled in a manner suited to different states of the navigation system. Other states such as heavy load navigating and entrance to a specific area may be added to the navigation system states as control conditions.

Hereinabove, this invention has been described in detail with reference to the accompanying drawings. However, this invention is not limited to the concrete configuration described, but encompasses various modifications within and configurations equivalent to the accompanying claims.

INDUSTRIAL APPLICABILITY

This invention is applicable to a location information device capable of playing a widget that is added by a user or others. In particular, this invention enables a location information device that has few hardware resources to play the widget 110 by restricting widget operation, but only to the extent that the intention of the creator of the widget is reflected. This invention can also be applied to a location information device which is equipped with a function of deleting the widget 110 that is added by a user or others and which is required to have reliability, and to a control program of the location information device.

The invention claimed is:

1. An information terminal device, which provides information for navigation to a set destination, the information terminal device comprising:
   a CPU for performing computing processing;
   a memory for storing information;
   a location information detecting module for detecting a current location and thereby detecting a traveling state;
   a navigation module for calculating location information from the detected current location and from map information, and calculating navigation information with respect to a set destination;
   a display unit for displaying the location information and the navigation information;
   a communication module for communicating over a network; and
   a widget management module for managing execution of a widget, which is a single-function program and displays on the display unit,
   wherein the widget management module comprises:
      a policy determining module for setting to the widget an operation policy, which comprises an operation restriction concerning a display state on the display unit and a priority; and
      a reliability determining module for determining reliability of the widget,
   wherein, when the traveling state reaches a preset state, the widget management module restricts operation of the widget in accordance with the operation restriction and the reliability, and displays preferentially the location information and information about a navigation state, and
   wherein the communication module transmits to a management server a widget list held in the widget management module, to thereby request a list of downloadable widgets, and obtains the list of downloadable widgets from the management server.

2. The information terminal device according to claim 1, wherein the widget management module manages execution of a plurality of widgets and, when the traveling state reaches a preset state, controls a display state of a widget that is low in the reliability or in the priority.

3. The information terminal device according to claim 1, wherein the widget management module measures a load of the CPU, compares the measured CPU load against a preset threshold, and, when the load exceeds the threshold, controls the display state of a widget that is low in the priority.

4. The information terminal device according to claim 1, wherein, when the traveling state reaches a preset state, the widget management module controls the display state of the widget by changing a display position of the widget in accordance with the operation restriction and the reliability, and displaying preferentially the detected current location and the navigation information.

5. The information terminal device according to claim 1, wherein the preset state includes a driving state in which the detected current location changes and a navigating state in which the detected current location changes and the navigation information is output to the display unit as well.

6. The information terminal device according to claim 1, wherein, when the traveling state changes and the display state of the widget is to be controlled, the widget management module displays an alert on the display unit.

7. The information terminal device according to claim 1, wherein the widget comprises a necessary animation, which comprises an operation tip, and a dramatizing animation, which does not comprise an operation tip, and
   wherein the widget management module is configured to:
      control display of the dramatizing animation when the display state of the widget is to be controlled; and
      control the display state of the necessary animation when the display state of the widget is to be further controlled.

8. The information terminal device according to claim 1, wherein the widget management module measures a load of the CPU and transmits a history of the load to the management server.

9. An information terminal management system, comprising:
   an information terminal device which provides information for navigation to a set destination; and
   a management server which communicates with the information terminal device over a network,
   wherein the information terminal device comprises:
      a CPU for performing computing processing;
      a memory for storing information;
      a location information detecting module for detecting a current location and thereby detecting a traveling state;
      a navigation module for calculating location information from the detected current location and from map information, and calculating navigation information with respect to a set destination;
      a display unit for displaying the location information and the navigation information;
      a communication module for communicating over the network; and
      a widget management module for managing execution of a widget, which is a single-function program and displays on the display unit,
   wherein the widget management module comprises:
      a policy determining module for determining, for the widget, an operation policy, which comprises an operation restriction concerning a display state on the display unit and a priority; and
      a reliability determining module for determining reliability of the widget,
   wherein, when the navigation state reaches a preset state, the widget management module controls the display state of the widget in accordance with the operation restriction and the reliability, and displays preferentially the location information and a navigation state, wherein the communication module transmits to the management server a widget list held in the widget management module, to thereby request a list of downloadable widgets, and wherein, when a request for the widget list is received from the information terminal device, the management server obtains the widget list held by the widget management module, selects widgets that can be downloaded to the information terminal device, and transmits a list of the selected widgets to the information terminal device.

10. The information terminal management system according to claim 9, wherein the management server comprises a blacklist that lists unauthorized widgets, and wherein, when an unauthorized widget on the blacklist is included in the widget list received from the information terminal device, an alert is transmitted to the information terminal device.

11. The information terminal management system according to claim 9, wherein the widget management module measures a load of the CPU and transmits a history of the load to the management server, and wherein the management server keeps the load history received from the information terminal device.

12. The information terminal management system according to claim 9, wherein the widget management module measures a load of the CPU and transmits a history of the load to the management server.

13. A non-transitory computer readable storage medium having stored thereon a program for controlling an information terminal device which provides information for navigation to a set destination, the information terminal device comprising: a CPU for performing computing processing; a memory for storing information; a location information detecting module for detecting a current location and thereby detecting a traveling state; a navigation module for calculating location information from the detected current location and from map information, and calculating navigation information with respect to a set destination; a display unit for displaying the location information and the navigation information; and a communication module for communicating over a network, the program stored on the non-transitory computer readable storage medium is executable by the CPU and the program comprises the steps of: determining, for a widget which is a single-function program and displays on the display unit, an operation policy, which comprises an operation restriction concerning a display state on the display unit and a priority; determining reliability of the widget; executing the widget; when the traveling state reaches a preset state, controlling a display state of the widget in accordance with the operation restriction and the reliability, and displaying preferentially the location information and a navigation state; transmitting to a management server a widget list held in a widget management module, to thereby request a list of downloadable widgets; and obtaining the list of downloadable widgets from the management server.

14. The non-transitory computer readable storage medium having stored thereon a program for controlling an information terminal device which provides for navigation to a set destination according to claim 13, wherein the program performs the steps of measuring a load of the CPU and transmitting a history of the load to the management server.

* * * * *